US006947094B2

(12) United States Patent
Hoshino et al.

(10) Patent No.: US 6,947,094 B2
(45) Date of Patent: Sep. 20, 2005

(54) IMAGE SIGNAL PROCESSING APPARATUS AND METHOD

(75) Inventors: Takaya Hoshino, Saitama (JP); Toshio Sarugaku, Chiba (JP); Ikuo Someya, Tokyo (JP); Makoto Kondo, Kanagawa (JP); Nobuo Ueki, Chiba (JP); Masuyoshi Kurokawa, Kanagawa (JP); Kazuhiko Nishibori, Kanagawa (JP); Koji Aoyama, Saitama (JP); Yukihiko Mogi, Kanagawa (JP)

(73) Assignee: Sony Corporation, Tokyo (JP)

( * ) Notice: Subject to any disclaimer, the term of this patent is extended or adjusted under 35 U.S.C. 154(b) by 540 days.

(21) Appl. No.: 10/266,468

(22) Filed: Oct. 8, 2002

(65) Prior Publication Data

US 2003/0107672 A1 Jun. 12, 2003

(30) Foreign Application Priority Data

Oct. 9, 2001 (JP) ....................................... 2001-311983
Dec. 13, 2001 (JP) ....................................... 2001-380761

(51) Int. Cl.[7] .................................................. H04N 7/01
(52) U.S. Cl. ........................ 348/441; 348/459; 348/699
(58) Field of Search ................................ 348/441, 443, 348/447, 448, 452, 458, 459, 699, 700, 701; H04N 7/01, 11/20

(56) References Cited

U.S. PATENT DOCUMENTS 4,663,665 A 5/1987 Tanaka et al.
5,365,273 A 11/1994 Correa et al.
5,398,071 A 3/1995 Gove et al.
5,410,356 A * 4/1995 Kikuchi et al. ............. 348/452
5,610,662 A 3/1997 Hackett
6,636,267 B1 * 10/2003 Adachi ....................... 348/448

OTHER PUBLICATIONS

Haan De G et al: "IC for Motion–Compensated 100 HZ TV with Natural–Motion Movie–Mode" IEEE Transactions on Consumer Electronics, IEEE Inc. New York, US, vol. 42, No. 2, May 1, 1996, pp. 165–174, XP000596762 ISSN: 0098–3063.

Masahiko Achiha et al: "Motion–Adaptive Enhanced Decoder and Up–Converter for Pal Signals" Broadcast Sessions. Montreux, Jun. 13–18, 1991, Proceedings of the International Television Symposium and Technical Exhibition, Geneva, CCITT, CH, Jun. 13, 1991, pp. 197–208, XP000268889.

* cited by examiner

*Primary Examiner*—Sherrie Hsia
(74) *Attorney, Agent, or Firm*—Frommer Lawrence & Haug LLP; William S. Frommer

(57) ABSTRACT

An image signal processing apparatus according to the present invention receives an image signal inputted thereto that is generated by subjecting a telecine-converted image to double speed conversion, in which signal one film frame is formed by four fields, identifies a first field on the basis of a difference value calculated between pixel signal levels, and shifts the position of a detected pixel in a vector direction of a motion vector such that an amount of shift is progressively increased as transition is made from the identified first field to the subsequent fields.

24 Claims, 20 Drawing Sheets

IMAGE SIGNAL PROCESSING APPARATUS AND METHOD

BACKGROUND OF THE INVENTION

The present invention relates to an apparatus and a method for image signal processing that shift the position of detected pixels of an image signal generated by double speed conversion in which signal one frame is formed by two fields or four fields.

As a scanning system of television broadcast, the interlaced scanning system has conventionally been most widely used in which every other horizontal scanning line is scanned in an interlaced manner. The interlaced scanning system forms one frame image of a field image formed by odd-numbered scanning lines and a field image formed by even-numbered scanning lines. The interlaced scanning system thereby suppresses plane flicker disturbance in which the whole screen appears to be flickering, and thus prevents degradation in picture quality.

The interlaced scanning system is employed as a television standard in various countries in the world. The PAL (Phase Alternation by Line) system used in television broadcast in Europe, for example, has a field frequency of 50 [Hz] (25 frame images per second and 50 field images per second).

In order to further suppress plane flicker disturbance, in the PAL system, in particular, a field frequency doubling method has conventionally been employed which converts an input image signal having the field frequency of 50 Hz into an image signal having double the frequency of 100 Hz by performing processing such as interpolation or the like.

FIG. 18 shows an example of block configuration of a field double speed conversion circuit 5 to which the field frequency doubling method is applied. The field double speed conversion circuit 5 is integrated into a television receiver 6 that includes an input terminal 61, a CRT 63, and a horizontal and vertical deflection circuit 62. The field double speed conversion circuit 5 includes a double speed conversion unit 51 and a frame memory 52.

The double speed conversion unit 51 writes an image signal of 50 fields per second of the PAL system, for example, inputted from the input terminal 61 into the frame memory 52. Also, the double speed conversion unit 51 reads the image signal written into the frame memory 52 at a speed twice that at the time of the writing. The double speed conversion unit 51 can thereby double the frequency of the image signal of 50 fields per second, and generate an image signal of 100 fields per second.

The double speed conversion unit 51 outputs the double-speed-converted image signal to the CRT 63. The CRT 63 displays the image signal inputted thereto on the screen. Deflection in a horizontal and a vertical direction for the image signal in the CRT 63 is controlled on the basis of horizontal and vertical sawtooth waves having a frequency twice that of the input image signal and generated by the horizontal and vertical deflection circuit 62.

FIGS. 19A and 19B show a relation between a pixel position and each field in image signals before and after double speed conversion. In the figure, the axis of abscissas indicates time, and the axis of ordinates indicates pixel position in a vertical direction. The image signal indicated by white circles in FIG. 19A is an interlaced image signal of 50 fields per second before the double speed conversion, while the image signal indicated by black circles in FIG.

19B is an interlaced image signal of 100 fields per second after the double speed conversion.

In the image signal shown in FIG. 19A, a field f1 and a field f2 are signals generated from the same film frame, and similarly a field f3 and a field f4 include the same film frame. Since these image signals are interlaced image signals, the pixel position in the vertical direction differs between fields adjacent to each other. Hence, it is not possible to newly generate one field between each pair of fields while maintaining the interlaced state.

Accordingly, as shown in FIG. 19B, two fields f2' and f1' are newly generated between the field f1 and the field f2. No fields are generated between the field f2 and the field f3. Two fields f4' and f3' are newly generated between the field f3 and the field f4. Thus, one film frame is formed by four fields or two frames.

A value of each pixel of the newly generated fields f1', f2', . . . may be obtained as a median value of three pixels around the periphery of the pixel by using a median filter or the like. The newly generated fields f1', f2', . . . have the same contents as the fields f1, f2, . . . , respectively.

Thus, the field double speed conversion circuit 5 alternately disposes a portion where two fields are newly generated and a portion where no fields are generated between fields of the image signal before the double speed conversion. It is thereby possible to increase the number of screens per unit time and consequently prevent the above-mentioned plane flicker disturbance.

For a cinema film formed by still pictures of 24 frames per second to be viewed on ordinary television, television-cinema conversion (hereinafter referred to as telecine conversion) is performed to convert the film into an interlaced television signal. FIGS. 20A and 20B show a relation between an image position and each field when an image of the image signal after the telecine conversion moves in a horizontal direction. In the figures, the axis of abscissas indicates image position in the horizontal direction, and the axis of ordinates indicates time. Since the fields f1 and f2 of the image signal before double speed conversion shown in FIG. 20A include the same film frame, the image is displayed at the same position in the fields f1 and f2. With a transition to the field f3, the image moves in the horizontal direction (to the right). Since the field f4 and the field f3 form the same film frame, the image in the field f4 is displayed at the same position as in the field f3.

After the image signal after the telecine conversion shown in FIG. 20A is subjected to double speed conversion by the field frequency doubling method, the same image is displayed at the same position in the fields f1, f2', f1', and f2 forming the same film frame, as shown in FIG. 20B. Similarly, the same image is displayed at the same position in the fields f3, f4', f3', and f4 forming the same film frame.

FIG. 21A shows a relation between an image position and each field when an image of a television signal (hereinafter referred to as a TV signal) before double speed conversion moves in the horizontal direction. In FIG. 21A, fields f1, f2, f3 . . . each form an independent film frame, and therefore the image is displayed at different positions in the fields. The image moves in the horizontal direction (to the right) with each transition from the field f1 to f2, f3 . . . .

After the image signal of the TV signal shown in FIG. 21A is subjected to double speed conversion by the field frequency doubling method, the same image is displayed at the same position in the fields f1 and f2' forming the same film frame, as shown in FIG. 21B. Similarly, the same image is displayed at the same position in the fields f1' and f2 forming the same film frame.

However, as shown in FIG. 20B, while the image of the image signal after the telecine conversion and the double speed conversion is displayed at the same position in the fields f1 to f2, the image moves greatly in the horizontal direction when a transition is made from f2 to f3. Similarly, as shown in FIG. 21B, while the image of the image signal obtained by subjecting the TV signal to the double speed conversion is displayed at the same position in the fields f1 and f2', the image moves greatly in the horizontal direction when a transition is made from f2' to f1'.

In particular, the output image signal forms each field at a regular interval of 1/100 second. Therefore, a time period of motion of the image is shorter than a time period of stillness of the image. When a program is actually viewed on the CRT, motion of the image appears to be discontinuous.

Further, it is necessary to efficiently eliminate the discontinuity of image motion even when both a telecine-converted image signal and a TV signal are inputted.

SUMMARY OF THE INVENTION

It is an object of the present invention to provide an apparatus and a method for image signal processing that can smoothen motion of an image of an image signal generated by subjecting a telecine-converted signal or a TV signal to double speed conversion while suppressing plane flicker disturbance, and thereby improve image quality synergistically.

In carrying out the invention, there is provided an apparatus and a method for image signal processing, including: sequence detecting means for receiving an image signal inputted thereto that is generated by subjecting an image obtained by converting a cinema film image into a video image, or by so-called telecine conversion, to double speed conversion, in which signal a film frame begins with a first field and one film frame is formed by four fields, calculating a difference value between pixel signal level of a detected pixel in a present field and pixel signal level of a detected pixel at a position identical with a position of the detected pixel in the present field in a field one frame after the present field, and identifying the first field on the basis of the difference value; motion vector detecting means for detecting a motion vector of the detected pixel in the present field with respect to a field two frames after the present field; and image control means for shifting the position of the detected pixel in the present field in a vector direction of the detected motion vector or in a direction opposite to the vector direction within a range of a vector quantity of the motion vector; wherein the image control means sets an amount of shift to a minimum in the first field and progressively increases or decreases the amount of shift for each field subsequent to the first field.

According to the present invention, there is provided an image signal processing apparatus including: sequence detecting means for receiving an image signal inputted thereto that is generated by subjecting an image obtained by converting a film image into a video image to double speed conversion, in which signal a film frame begins with a first field and one film frame is formed by four fields, calculating a difference value between pixel signal level of a detected pixel in a present field of the inputted image signal and pixel signal level of a detected pixel at a position identical with a position of the detected pixel in the present field in a field one frame after the present field of the inputted image signal, and identifying the first field on the basis of the difference value; motion vector detecting means for detecting a motion vector of the detected pixel in the present field with respect to a field two frames after the present field; and image control means for shifting the position of the detected pixel in the present field in a vector direction of the detected motion vector within a range of a vector quantity of the motion vector; wherein the image control means sets an amount of shift to a minimum in the first field identified by the sequence detecting means and progressively increases the amount of shift for each field subsequent to the first field.

DETAILED DESCRIPTION OF PREFERRED EMBODIMENTS

An apparatus and a method for image signal processing to which the present invention is applied will hereinafter be described in detail with reference to the drawings.

Figure 1:
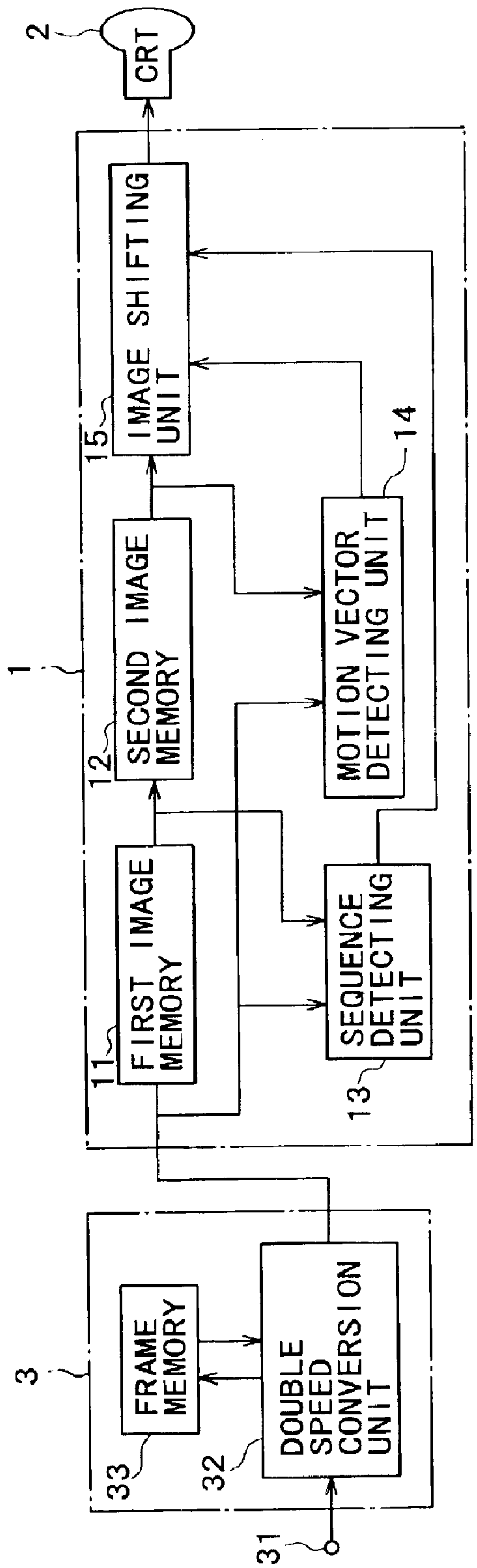
FIG. 1 is a block diagram of an image signal processing apparatus in a first embodiment of the present invention.

FIG. 1 is a block diagram of an image signal processing apparatus 1 in a first embodiment of the present invention. The image signal processing apparatus 1 is for example included in a television receiver using the PAL (Phase Alternation by Line) system, and is supplied with a telecine-converted image signal. As shown in FIG. 1, the image signal processing apparatus 1 includes: a first image memory 11; a second image memory 12; a sequence detecting unit 13; a motion vector detecting unit 14; and an image shifting unit 15.

The first image memory 11 is sequentially supplied with an interlaced image signal of 100 fields per second, for example, which is generated by subjecting a telecine-converted image to double speed conversion and whose film frame is formed by four fields.

The first image memory 11 stores one frame of the image signal supplied thereto in field units. That is, an image signal outputted from the first image memory 11 is one frame after the image signal supplied to the first image memory 11.

The second image memory 12 has an internal configuration similar to that of the first image memory 11. The second image memory 12 stores one frame of the image signal supplied thereto from the first image memory 11 in field units. That is, an image signal outputted from the second image memory 12 is one frame after the image signal supplied to the second image memory 12, and is two frames after the image signal supplied to the first image memory 11. The image signal stored in the second image memory 12 is supplied to the image shifting unit 15.

The sequence detecting unit 13 detects the image signal supplied to the first image memory 11 and the image signal outputted from the first image memory 11, compares image signal levels of the signals with each other in each pixel, and thereby calculates a difference value between the image signal levels. That is, the sequence detecting unit 13 compares the image signal levels of a pixel at the same position on the screen at an interval of one frame. The sequence detecting unit 13 transmits a result of the calculation of the difference value between the image signal levels to the image shifting unit 15.

The motion vector detecting unit 14 detects the image signal supplied to the first image memory 11 and the image signal outputted from the second image memory 12, and then detects a motion vector by a block matching method, for example. The block matching method divides a screen into blocks each formed of predetermined pixels, evaluates a degree of similarity in block units, and thereby obtains a motion vector. The motion vector detecting unit 14 transmits a motion vector detected for each pixel or each block to the image shifting unit 15.

The image shifting unit 15 receives the result of the comparison between the image signal levels from the sequence detecting unit 13. Also, the image shifting unit 15 receives the motion vector detected by the motion vector detecting unit 14. Further, the image shifting unit 15 shifts pixel positions of the image signal supplied from the second image memory 12 within a range of a vector quantity of the received motion vector and in a direction of the vector.

The image shifting unit 15 supplies a CRT 2 with an image signal obtained by shifting the pixel positions in field units. The CRT 2 displays the image signal supplied thereto on the screen. Deflection in a horizontal and a vertical direction for the image signal in the CRT 2 may be controlled by a horizontal and vertical deflection circuit not shown in the figure.

Incidentally, a field double speed conversion circuit 3 for double speed conversion of field frequency of the image signal may be integrated into the image signal processing apparatus 1. The field double speed conversion circuit 3 is integrated to improve resolution and thereby prevent plane flicker disturbance. In the PAL system, for example, the field double speed conversion circuit 3 performs processing such as interpolation or the like and thereby converts an image signal having a field frequency of 50 Hz to an image signal having double the frequency of 100 Hz.

As shown in FIG. 1, the field frequency conversion circuit 3 includes: an input terminal 31 connected to the television receiver; a double speed conversion unit 32; and a frame memory 33.

The double speed conversion unit 32 writes an image signal after telecine conversion inputted from the television receiver via the input terminal 31 into the frame memory 33. Also, the double speed conversion unit 32 reads the image signal written into the frame memory 33 at a speed twice that at the time of the writing. The double speed conversion unit 32 can thereby double the frequency of an image signal of 50 fields per second in the PAL system, for example, and generate an image signal of 100 fields per second. The double speed conversion unit 32 supplies the double-speed-converted image signal to the image signal processing apparatus 1.

Figure 2B:
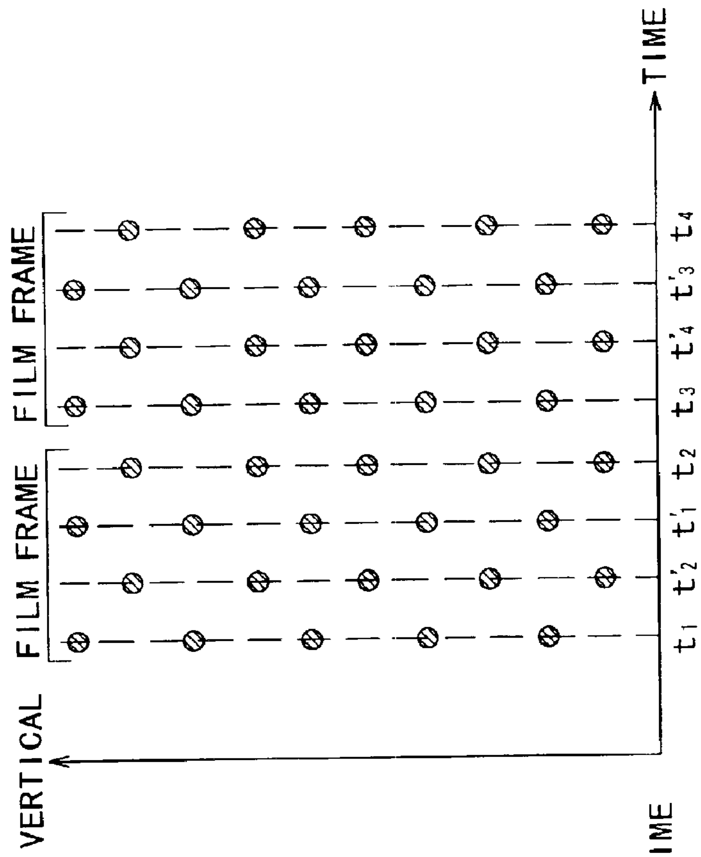
FIGS. 2A and 2B are diagrams showing a relation between a pixel position and each field before and after double speed conversion in a field double speed conversion circuit.
Figure 2A:
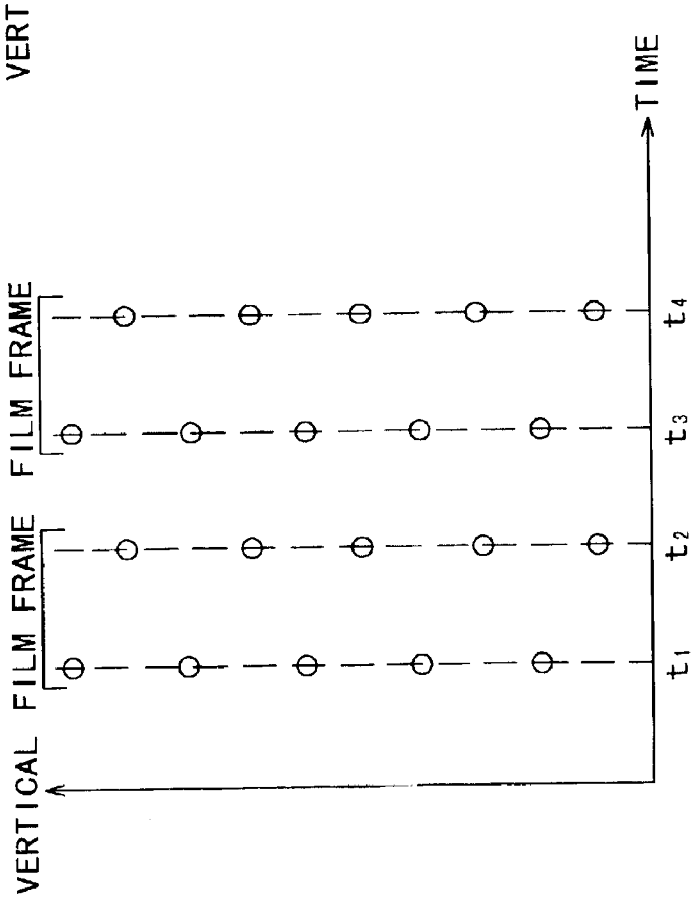

FIGS. 2A and 2B show a relation between a pixel position and each field before and after double speed conversion in the field double speed conversion circuit 3. In the figure, the axis of abscissas indicates time, and the axis of ordinates indicates pixel position in a vertical direction.

An image signal before double speed conversion is an interlaced image signal of 50 fields per second of the PAL system, and one film frame is formed by two fields, as shown in FIG. 2A.

On the other hand, an image signal after double speed conversion is an interlaced image signal of 100 fields per second, and therefore two fields t2' and t1' are newly generated between a field t1 and a field t2, as shown in FIG. 2B. No field is generated between the field t2 and a field t3. Two fields t4' and t3' are newly generated between the field t3 and a field t4. Thus, four fields form one film frame of the image signal.

A value of each pixel of the newly generated fields t1', t2', . . . may be obtained as a median value of three pixels around the periphery of the pixel by using a median filter or the like. The newly generated fields t1', t2', . . . have the same contents as the fields t1, t2, . . . , respectively. Thereby, four fields form one film frame to increase the number of screens per unit time. It is thus possible to improve resolution and thereby prevent plane flicker disturbance.

Operation of the image signal processing apparatus 1 according to the first embodiment will next be described.

Figure 3:
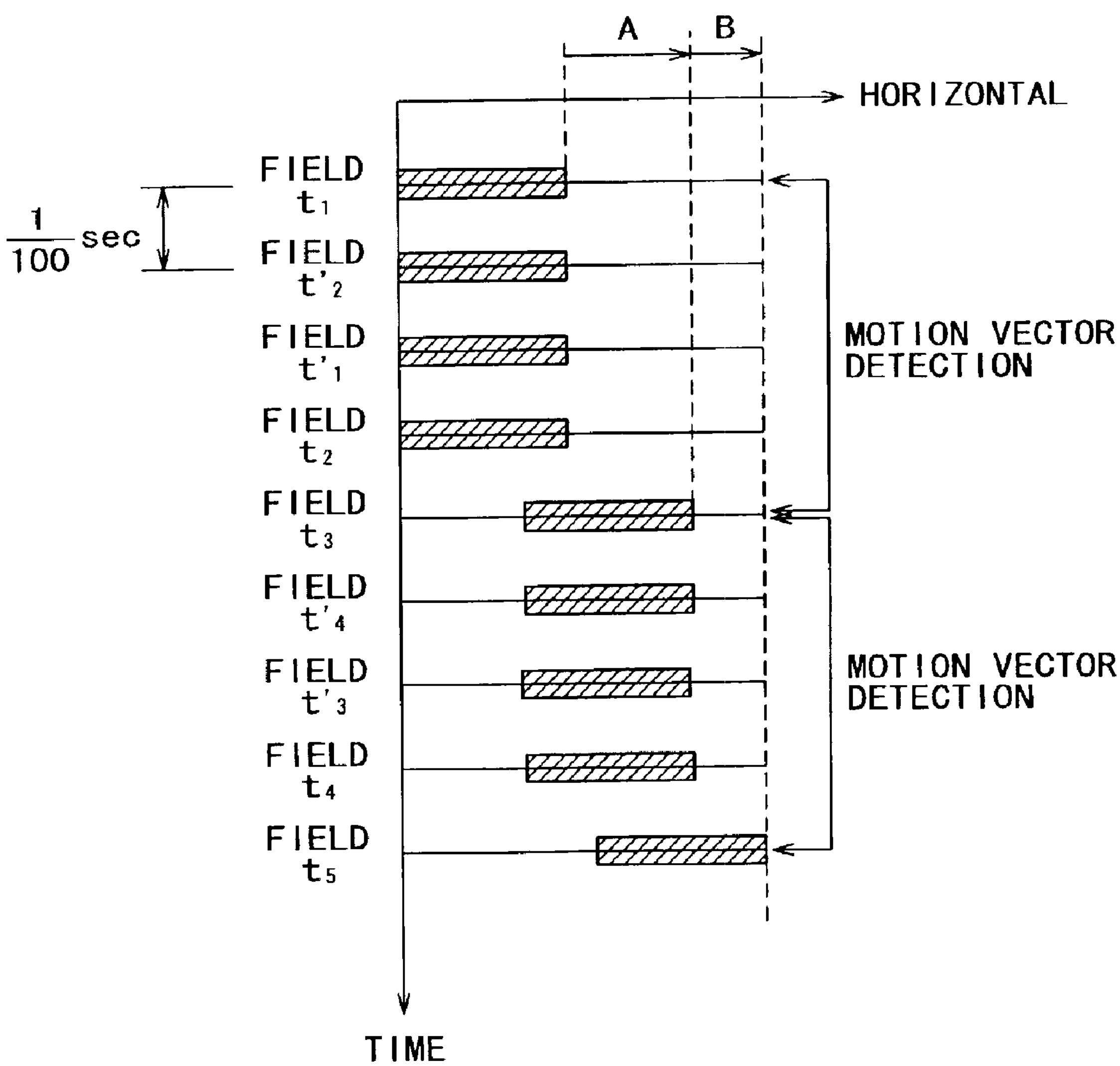
FIG. 3 is a diagram showing a relation between each field and an image position when an image moves in a horizontal direction in the first embodiment.

The field double speed conversion circuit 3 sequentially supplies the image signal processing apparatus 1 with an image signal after telecine conversion and double speed conversion which signal has a film frame formed by four fields. FIG. 3 shows a relation between each field and an image position when an image of the image signal moves in a horizontal direction. In FIG. 3, the axis of abscissas indicates image position in the horizontal direction, and the axis of ordinates indicates time. Images that have already been telecine-converted are supplied to the first image memory 11 at regular time intervals in order of fields t1, t2', t1', and t2, as shown in FIG. 3. The images are all displayed at the same position. When a transition to a field t3 is made, the image moves in the horizontal direction (to the right), and fields t3, t4', t3', and t4 are supplied to the first image memory 11 in that order.

When a field supplied to the first image memory 11 (hereinafter referred to as a reference field) is the field t3, for example, a field that is two frames before the reference field and is outputted from the second image memory 12 (hereinafter referred to as a two-frame delayed field) is the field t1.

The motion vector detecting unit 14 detects a motion vector for each pixel or each block unit between the reference field and the two-frame delayed field. A vector direction of the motion vector in the example shown in FIG. 3 is the horizontal direction (direction of the right) and a vector quantity of the motion vector is A with the two-frame delayed field as a reference. Similarly, when the reference field is t5, the two-frame delayed field is t3, and the vector quantity of the motion vector is B. By repeating this procedure, a vector direction and a vector quantity of a motion vector can be sequentially obtained with a two-frame delayed field as a reference. The motion vector detecting unit 14 sequentially transmits the vector directions and vector quantities of the motion vectors obtained to the image shifting unit 15.

The sequence detecting unit 13 sequentially detects a reference field and a field that is one frame before the reference field and is outputted from the first image memory 11 (hereinafter referred to as a one-frame delayed field), and calculates a difference value between pixel signal levels at the same pixel position.

Figure 4:
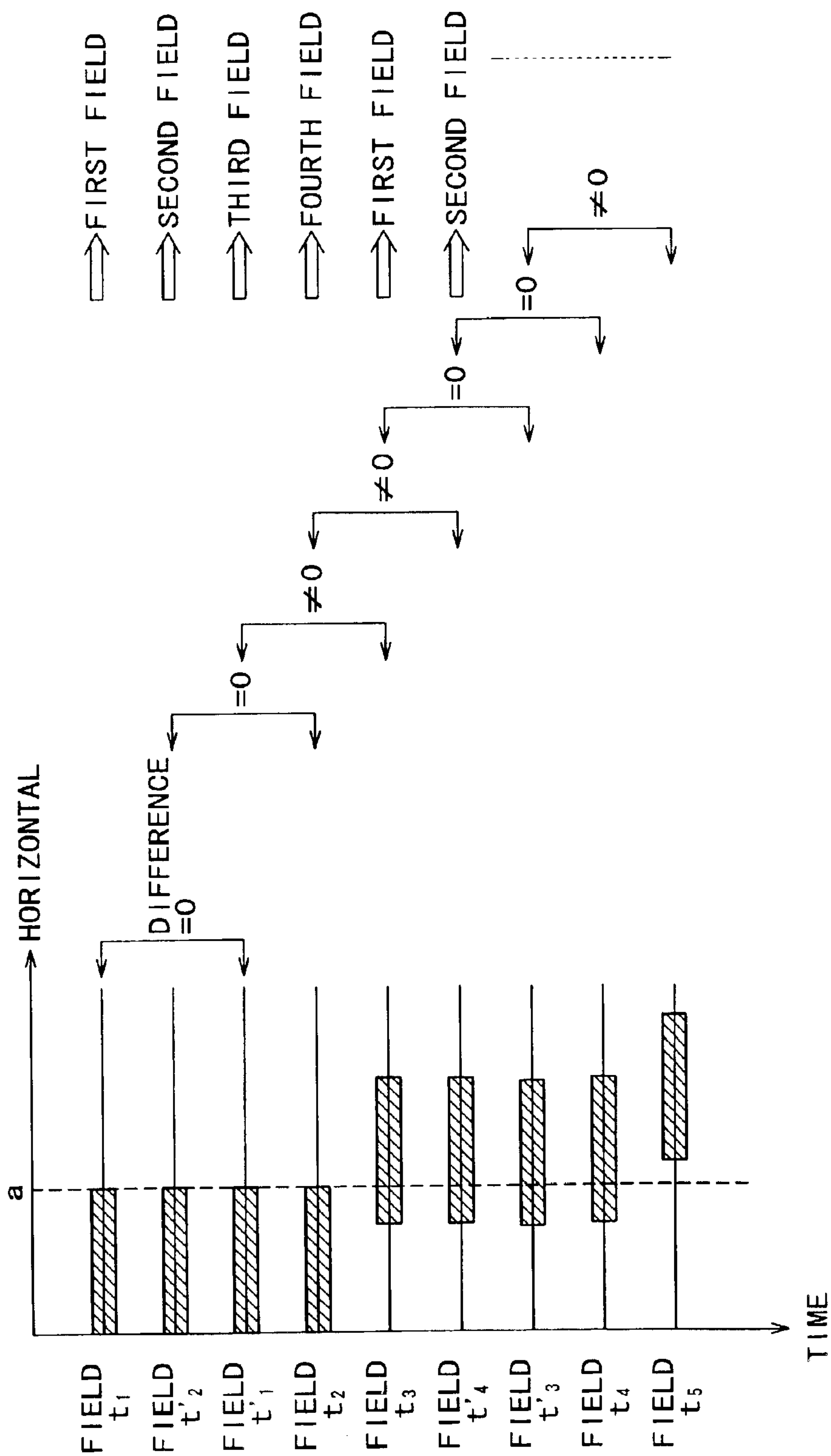
FIG. 4 is a diagram of assistance in explaining a sequence detecting method in the first embodiment.

Specifically, as shown in FIG. 4, a reference field t1' and a one-frame delayed field t1 form the same film frame, and therefore a difference value between pixel signal levels at a pixel position a, for example, is 0. When the field t2 is next supplied as the reference field, the one-frame delayed field is the field t2', and therefore the difference value between the pixel signal levels at the position a is also 0.

When the field t3 is next supplied as the reference field, the one-frame delayed field is t1', and the field t3 and the field t1' form their respective film frames separate from each other. Hence, the difference value between the pixel signal levels at the position a is other than 0 (hereinafter described as 1). When the field t4' is next supplied as the reference field, the one-frame delayed field is the field t2, and the difference value between the pixel signal levels at the position a is also 1.

Further, when the field t3' is next supplied as the reference field, the one-frame delayed field is the field t3. Since the field t3' and the field t3 form the same film frame, the difference value between the pixel signal levels at the position a is returned to 0. Reference fields supplied thereafter have a similar tendency, and difference values calculated have a cycle of four fields repeated in order of "0011." Hence, by detecting this sequence in a unit of four fields, it is possible to determine a relation of each field with a preceding and a succeeding field.

Directing attention to this tendency with respect to the one-frame delayed field, the difference value indicates "0011" in that order, starting with a first field of a film frame. Hence, as shown in FIG. 4, a one-frame delayed field detected when a difference value of 0 is first calculated is identified as the first field of a film frame (hereinafter referred to as a first field). A one-frame delayed field detected when a difference value of 0 succeeds is identified as a second field. Further, a one-frame delayed field detected when 1 is first calculated as the difference value is identified as a third field. Further, a one-frame delayed field detected when a difference value of 1 succeeds is identified as a fourth field.

The sequence detecting unit 13 transmits a result of the determination of the relation of each field with the preceding and succeeding fields as described above to the image shifting unit 15.

The image shifting unit 15 shifts the position of the detected pixel of the image signal supplied from the second image memory in the vector direction on the basis of the relation of each field with the preceding and succeeding fields determined by the sequence detecting unit 13.

Figure 5:
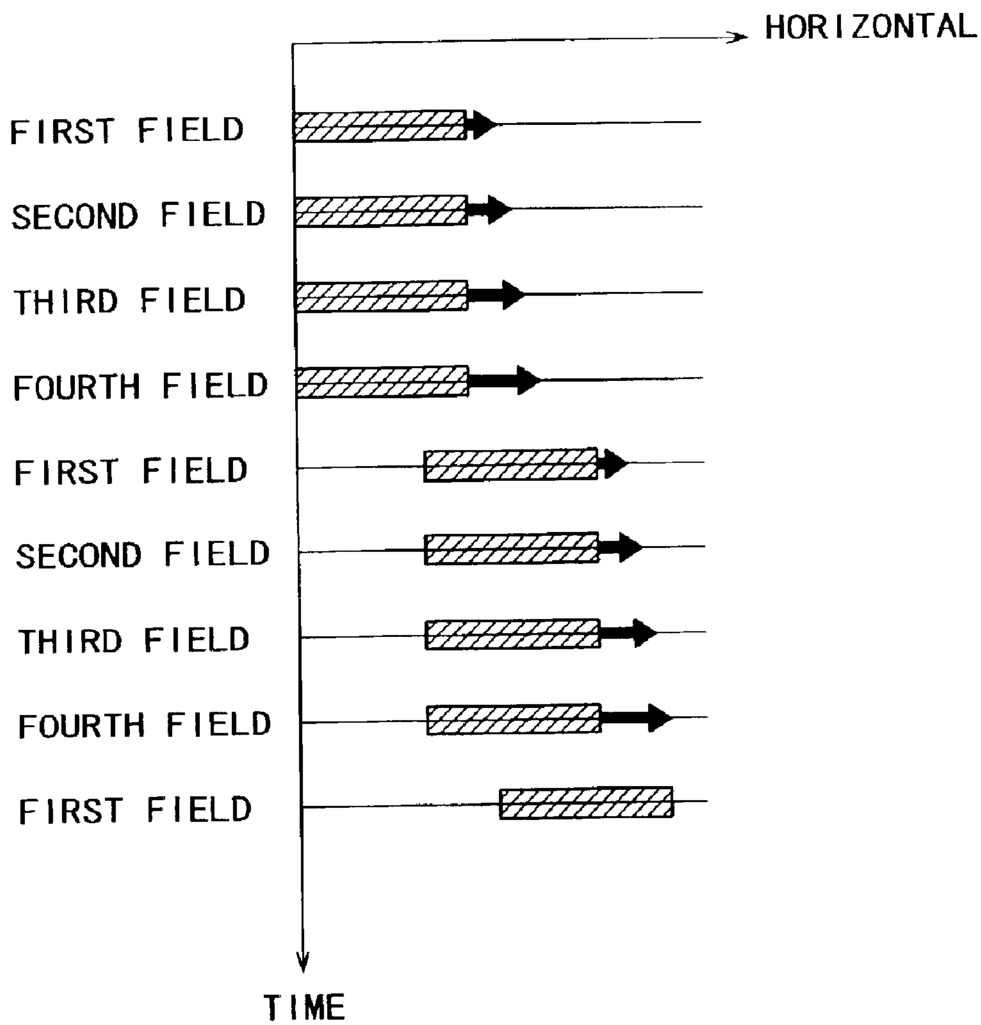
FIG. 5 is a diagram of assistance in explaining an image shifting method of an image shifting unit.

As shown in FIG. 5, an amount of shift is set to a minimum in a first field, and is progressively increased for each of the subsequent second and third fields. An amount of shift in a fourth field is set to a maximum. Since which of the first to fourth fields each field corresponds to is determined before the image signal is supplied to the image shifting unit 15, the position of the detected pixel can be shifted correctly and easily.

Figure 6:
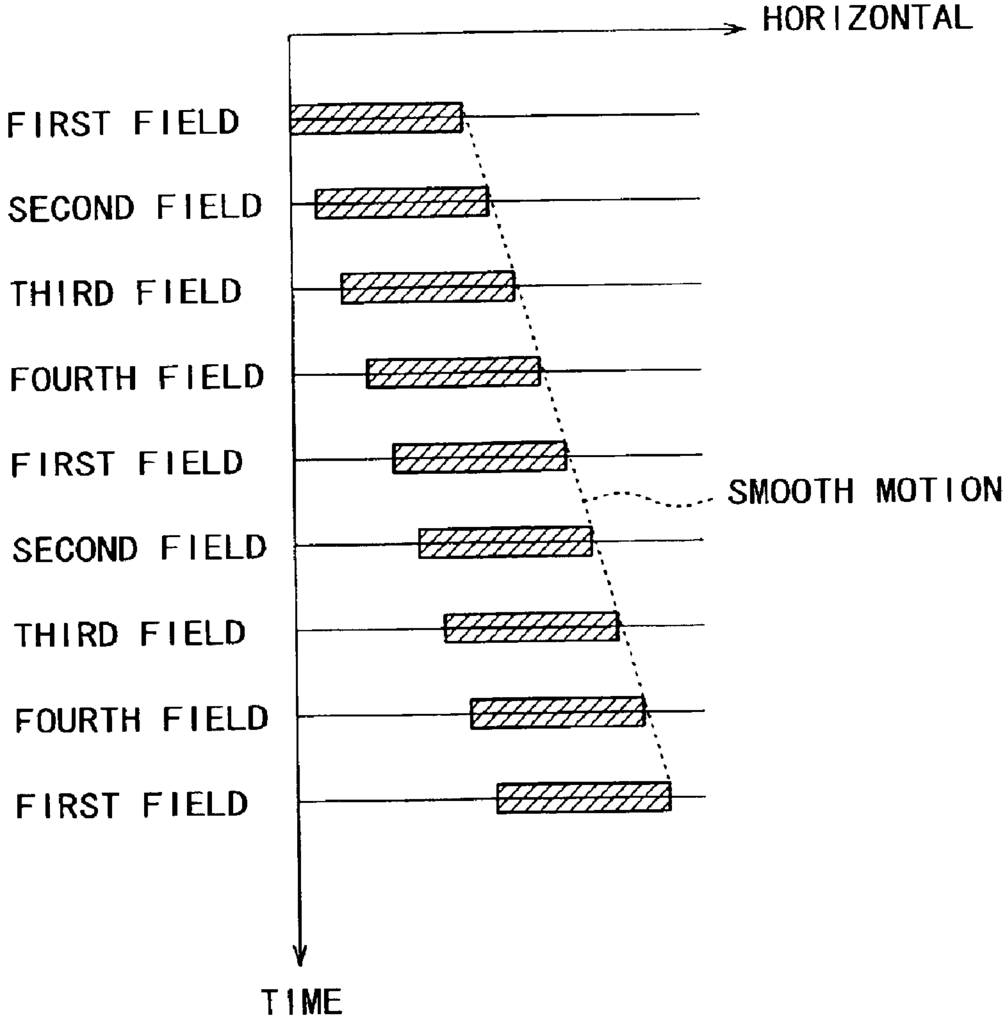
FIG. 6 is a diagram showing a result of the shifting of an image in each field.

FIG. 6 shows a result of the shifting of the image in each field. The image is gradually moved in the horizontal direction with each shift to a subsequent field. That is, the image shifting unit 15 can distribute to each field an amount of shift of the image which amount corresponds to the motion vector quantity. Thereby, the image can be moved more smoothly than before being shifted, without being moved greatly at the time of a transition from a fourth field to a first field.

By integrating the field double speed conversion circuit 3 into the image signal processing apparatus 1 according to the first embodiment and including the image signal processing apparatus 1 in the television receiver, it is possible to eliminate perceived discontinuity of motion that is specific to an image signal after telecine conversion and double speed conversion. Specifically, motion of each image having resolution improved and plane flicker disturbance suppressed by the field double speed conversion circuit 3 is further smoothened, whereby image quality can be improved synergistically.

Thus, the image signal processing apparatus 1 is not only implemented singly but also implemented integrally with the field double speed conversion circuit 3 to provide remarkable effects. Furthermore, a television receiver in which a field double speed conversion circuit is already integrated can be readily upgraded by including the image signal processing apparatus 1 afterwards.

Figure 7:
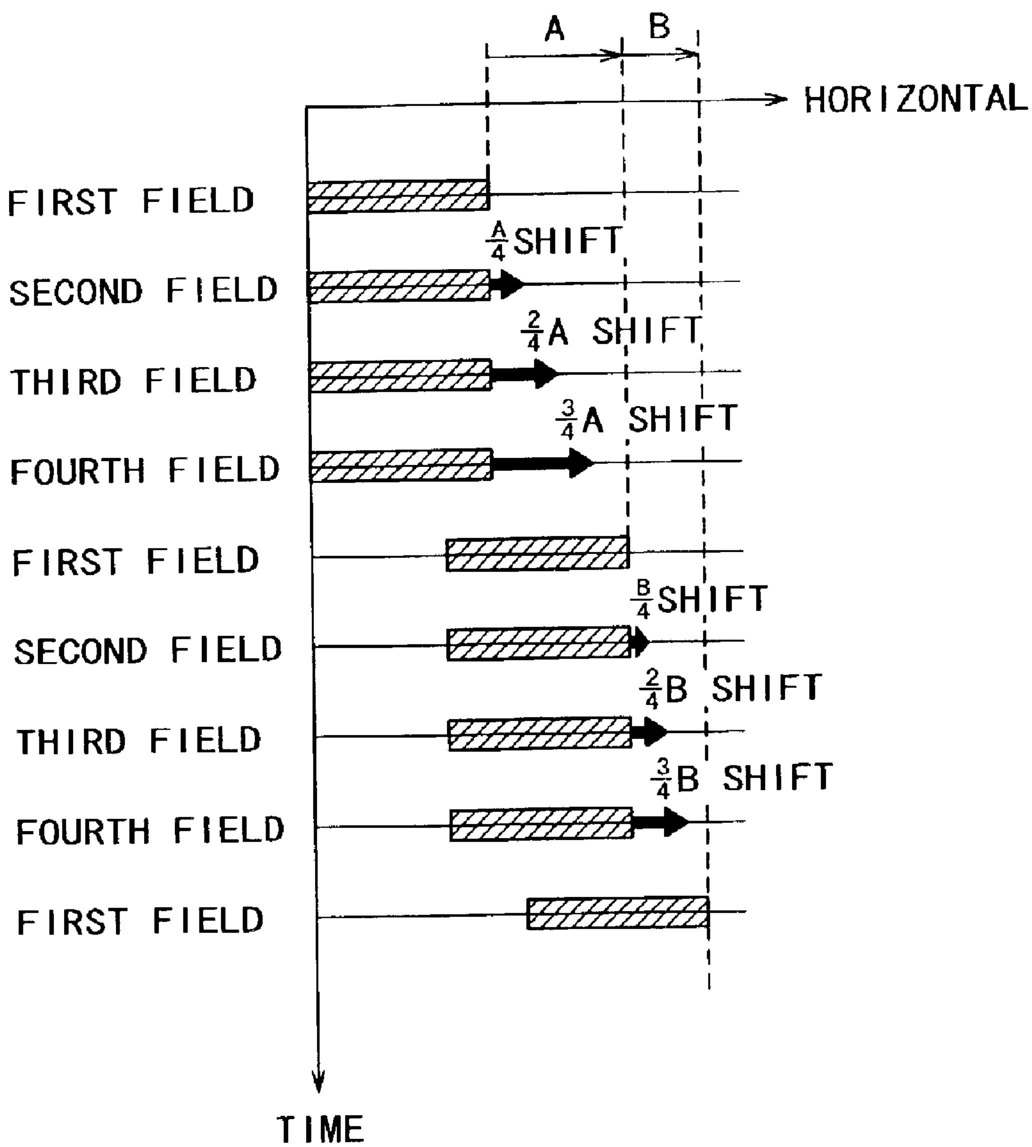
FIG. 7 is a diagram of assistance in explaining amounts of shift increased linearly with respect to time.

As shown in FIG. 7, for example, the amount of shift of the image by the image shifting unit 15 can be set to 0 for the first field and increased by ¼ the vector quantity of the detected motion vector for each of the fields subsequent to the first field. In the case of FIG. 7, the amount of shift for the first field is set to 0. When the vector quantity is A, the image is shifted by $A \times 1/4$ for the second field, by $A \times 2/4$ for the third field, and by $A \times 3/4$ for the fourth field. When the vector quantity is B, the image is shifted by $B \times 1/4$ for the second field, by $B \times 2/4$ for the third field, and by $B \times 3/4$ for the fourth field. Since one film frame is formed by four fields, the amount of shift is increased by ¼ the vector quantity, so that the amount of shift can be increased linearly with respect to time and motion of the image can be further smoothened.

Figure 8:
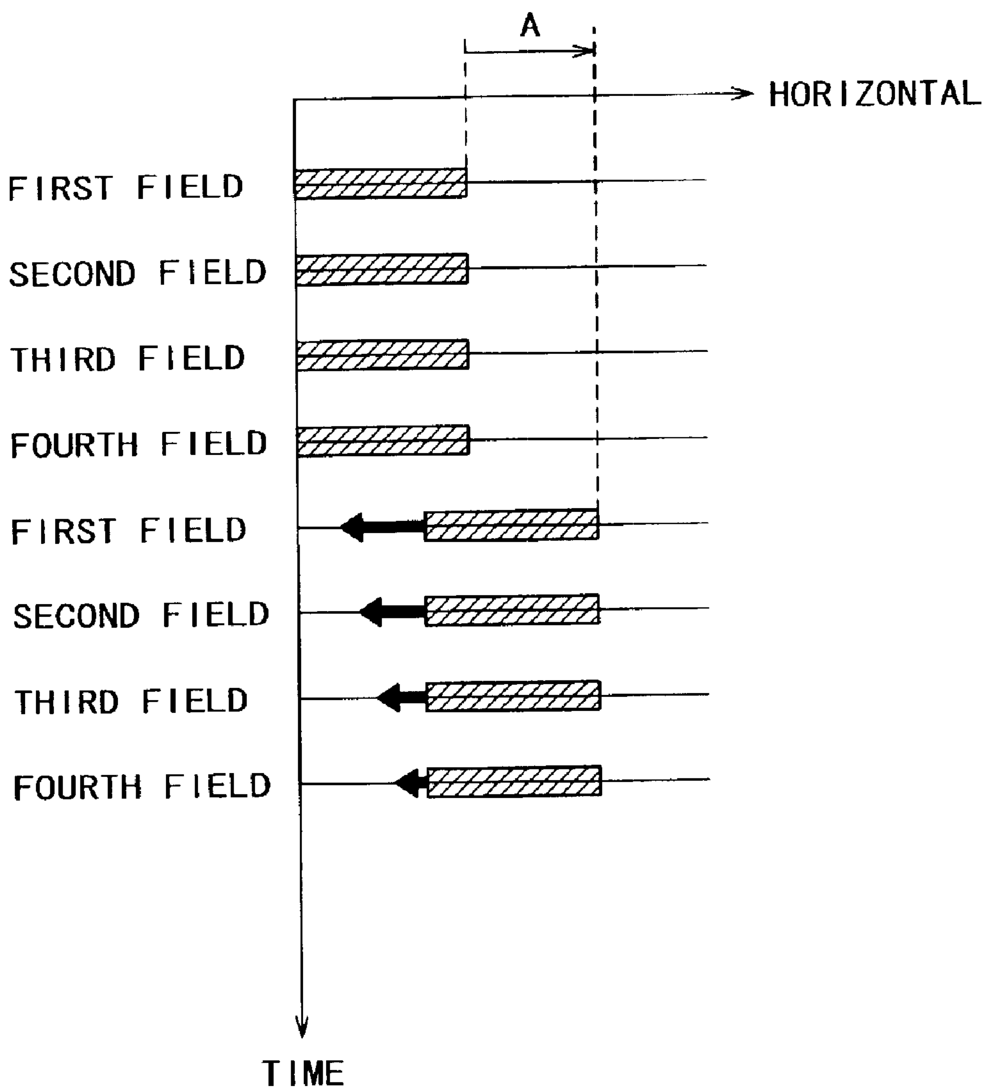
FIG. 8 is a diagram showing a case where an image is shifted in a direction opposite to a vector direction of a motion vector in the first embodiment.

It is to be noted that the image signal processing apparatus 1 according to the first embodiment is not limited to the above-described configuration and operation. For example, as shown in FIG. 8, the image can be shifted in a direction opposite to the vector direction of the motion vector. In FIG. 8, the amount of image shift at the time of the transition from the fourth field to the first field is distributed to the fields inputted subsequently, whereby similar effects to those of the embodiment shown in FIG. 5 can be obtained.

As shown in FIG. 8, the amount of shift is set to a maximum in the first field, and is progressively decreased for each of the subsequent second and third fields. The amount of shift in the fourth field is set to a minimum.

Also, the amount of shift can be set to ¾ the vector quantity of the detected motion vector for the first field, decreased by ¼ the vector quantity for each of the fields subsequent to the first field, and set to 0 for the fourth field. Thus, the amount of shift can be decreased linearly with respect to time and thereby motion of the image can be further smoothened.

Figure 9:
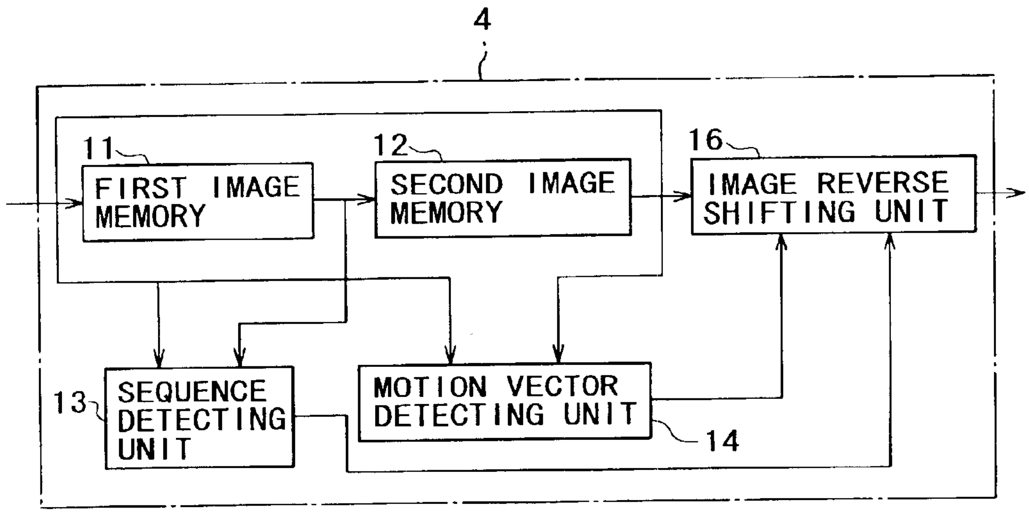
FIG. 9 is a block diagram of an image signal processing apparatus for shifting an image in a direction opposite to a vector direction of a motion vector in the first embodiment.

FIG. 9 shows an example of block configuration of an image signal processing apparatus 4 for shifting an image in a direction opposite to the vector direction of a motion vector. The same components as in FIG. 1 described above are identified by the same reference numerals, and their detailed description will be omitted.

The image signal processing apparatus 4 includes: a first image memory 11; a second image memory 12; a sequence detecting unit 13; a motion vector detecting unit 14; and an image reverse shifting unit 16.

The image reverse shifting unit 16 is supplied from the motion vector detecting unit 14 with a vector direction and a vector quantity of a motion vector with a two-frame delayed field as a reference. The image reverse shifting unit 16 is also supplied from the sequence detecting unit 13 with a result of determination of positional relation of a one-frame delayed field.

In addition, the image reverse shifting unit 16 is sequentially supplied from a field double speed conversion circuit 3 with an image signal whose film frame is formed by four fields. In the embodiment shown in FIG. 1, because of the necessity of shifting in previously inputted fields, so-called delayed fields outputted from the second image memory 12 are directly supplied to the image shifting unit 15. In the embodiment shown in FIG. 9, because shifting is performed in subsequently inputted fields, an image signal not delayed by an image memory is directly supplied to the image reverse shifting unit 16.

A second embodiment of the present invention will next be described in detail with reference to drawings.

Figure 10:
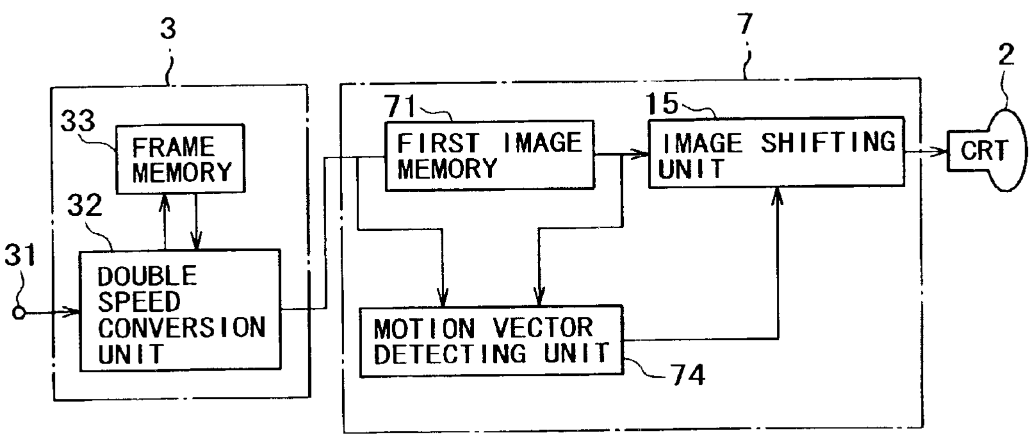
FIG. 10 is a block diagram of an image signal processing apparatus in a second embodiment.

FIG. 10 is a block diagram of an image signal processing apparatus 7 according to the second embodiment.

The image signal processing apparatus 7 is for example included in a television receiver using the PAL (Phase Alternation by Line) system, and is supplied with a television signal (hereinafter referred to as a TV signal).

As shown in FIG. 10, the image signal processing apparatus 7 includes: a first image memory 71; a motion vector detecting unit 74; and an image shifting unit 15. For the same circuit components as in the image signal processing apparatus 1 of the first embodiment, reference is to be made to the description of the first embodiment, and description of the circuit components will be omitted.

The first image memory 71 is sequentially supplied with an interlaced image signal of 100 fields per second, for example, which is generated by subjecting a TV signal to double speed conversion and whose frame is formed by two fields.

The motion vector detecting unit 74 detects the image signal supplied to the first image memory 71 and an image signal outputted from the first image memory 71, and then detects a motion vector by the block matching method, for example. The motion vector detecting unit 74 transmits a motion vector detected for each pixel or each block to the image shifting unit 15.

The image shifting unit 15 receives the motion vector detected by the motion vector detecting unit 74. Further, the image shifting unit 15 is supplied with a correction timing signal from a double speed conversion circuit 32. The correction timing signal includes information on whether a field in which to shift an image corresponds to a first field or a second field. Incidentally, a field double speed conversion circuit 3 for double speed conversion of field frequency of the image signal may be integrated into the image signal processing apparatus 7. The field double speed conversion circuit 3 is integrated to improve resolution and thereby prevent plane flicker disturbance. In the PAL system, for example, the field double speed conversion circuit 3 performs processing such as interpolation or the like and thereby converts an image signal having a field frequency of 50 Hz to an image signal having double the frequency of 100 Hz.

Operation of the image signal processing apparatus 7 according to the second embodiment will next be described.

Figure 11:
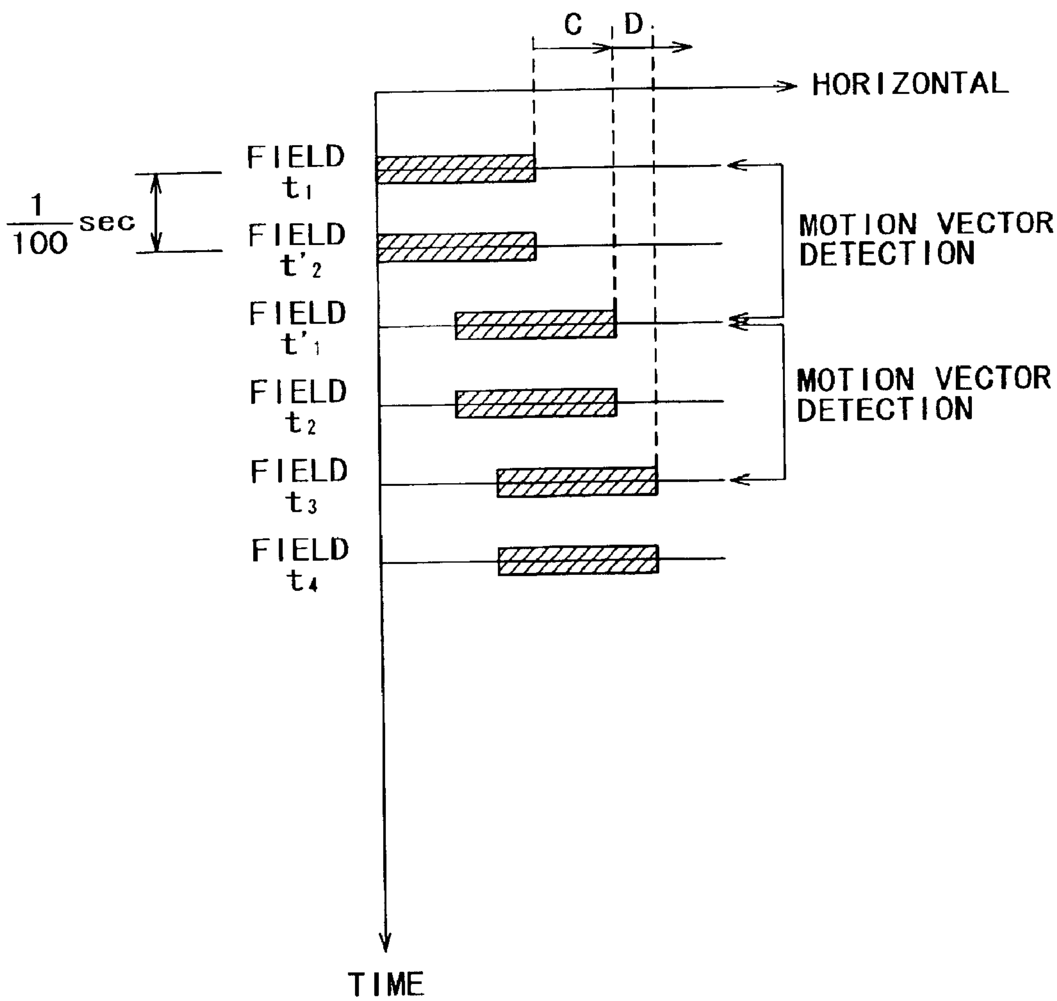
FIG. 11 is a diagram of assistance in explaining a motion vector detecting method in the second embodiment.

The field double speed conversion circuit 3 sequentially supplies the image signal processing apparatus 7 with an image signal in which one frame is formed by two fields which image signal is obtained by double speed conversion of a TV signal. FIG. 11 shows a relation between each field and an image position when an image of the image signal moves in a horizontal direction. In FIG. 11, the axis of abscissas indicates image position in the horizontal direction, and the axis of ordinates indicates time. When the image signal of the inputted TV signal is subjected to double speed conversion by the field frequency doubling method, the same image is displayed at the same position in fields t1 and t2' forming the same frame, as shown in FIG. 11. Similarly, the same image is displayed at the same position in fields t1' and t2 forming the same frame.

The motion vector detecting unit 74 detects a motion vector for each pixel or each block unit between a reference field and a one-frame delayed field. A vector direction of the motion vector in the example shown in FIG. 11 is the horizontal direction (direction of the right) and a vector quantity of the motion vector is C when the reference field is t1' with the one-frame delayed field as a reference. Similarly, when the reference field is t3, the one-frame delayed field is t1', and the vector quantity of the motion vector is D. By repeating this procedure, a vector direction and a vector quantity of a motion vector can be sequentially obtained with a one-frame delayed field as a reference. The motion vector detecting unit 74 sequentially transmits the vector directions and vector quantities of the motion vectors obtained to the image shifting unit 15.

The image shifting unit 15 shifts the position of a detected pixel of the image signal supplied from the first image memory 71 in the vector direction on the basis of relation of each field with the preceding and succeeding fields.

Figure 12:
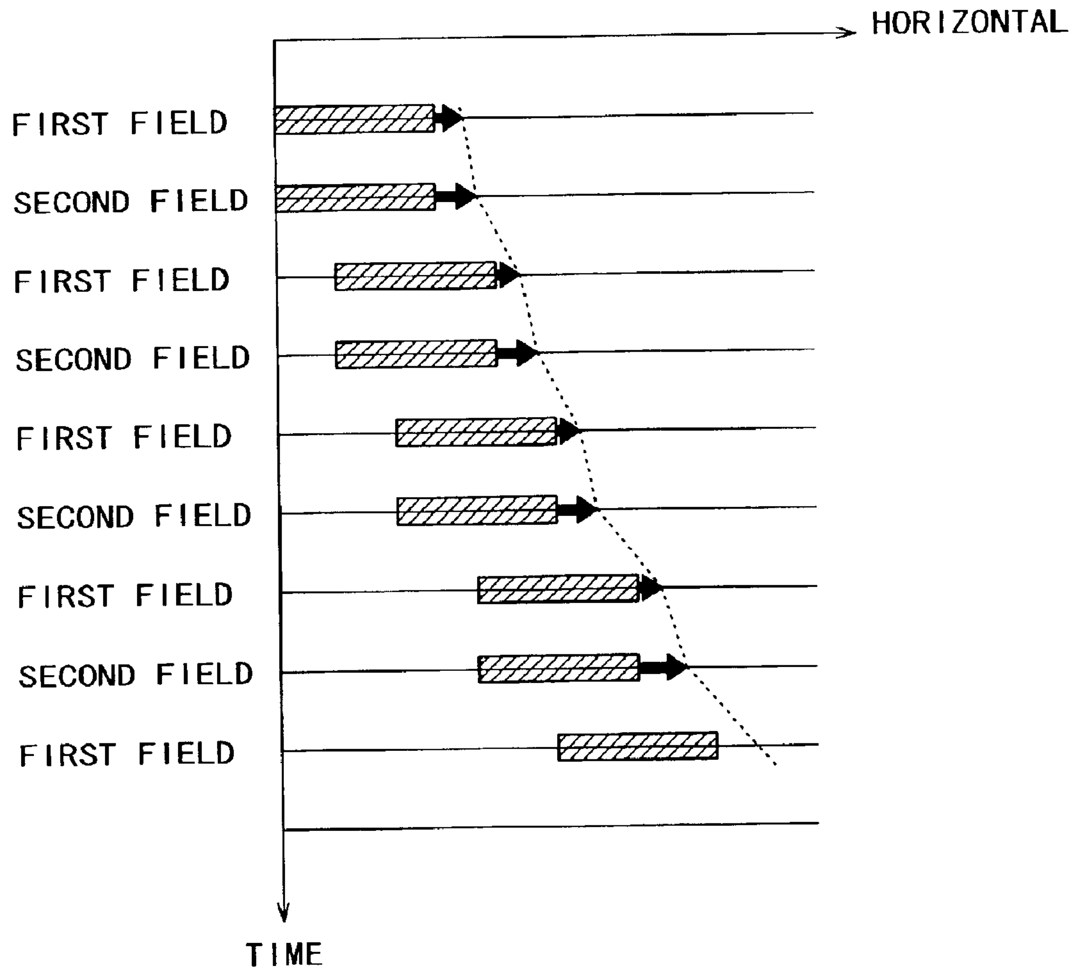
FIG. 12 is a diagram showing a result of the shifting of an image in the second embodiment.

As shown in FIG. 12, an amount of shift is progressively increased so that an amount of shift in a first field<an amount of shift in a second field. Incidentally, while determining whether each field corresponds to a first field or a second field requires detecting a sequence in a unit of two fields, whether each field corresponds to a first field or a second field is determined at the time of double speed conversion by the field double speed conversion circuit 3, and therefore such sequence detection is not required.

The image shifted as described above can be indicated by dotted lines in FIG. 12. The image can be moved more smoothly than before being shifted, without being moved greatly at the time of a transition from a second field to a first field.

By integrating the field double speed conversion circuit 3 into the image signal processing apparatus 7 according to the second embodiment and including the image signal processing apparatus 7 in the television receiver, it is possible to eliminate perceived discontinuity of motion in images obtained by double speed conversion of a TV signal. Specifically, motion in each image having resolution improved and plane flicker disturbance suppressed by the field double speed conversion circuit 3 is further smoothened, whereby image quality can be improved synergistically.

Thus, the image signal processing apparatus 7 is not only implemented singly but also implemented integrally with the field double speed conversion circuit 3 to provide remarkable effects. Furthermore, a television receiver in which a field double speed conversion circuit is already integrated can be readily upgraded by including the image signal processing apparatus 7 afterwards.

Figure 13:
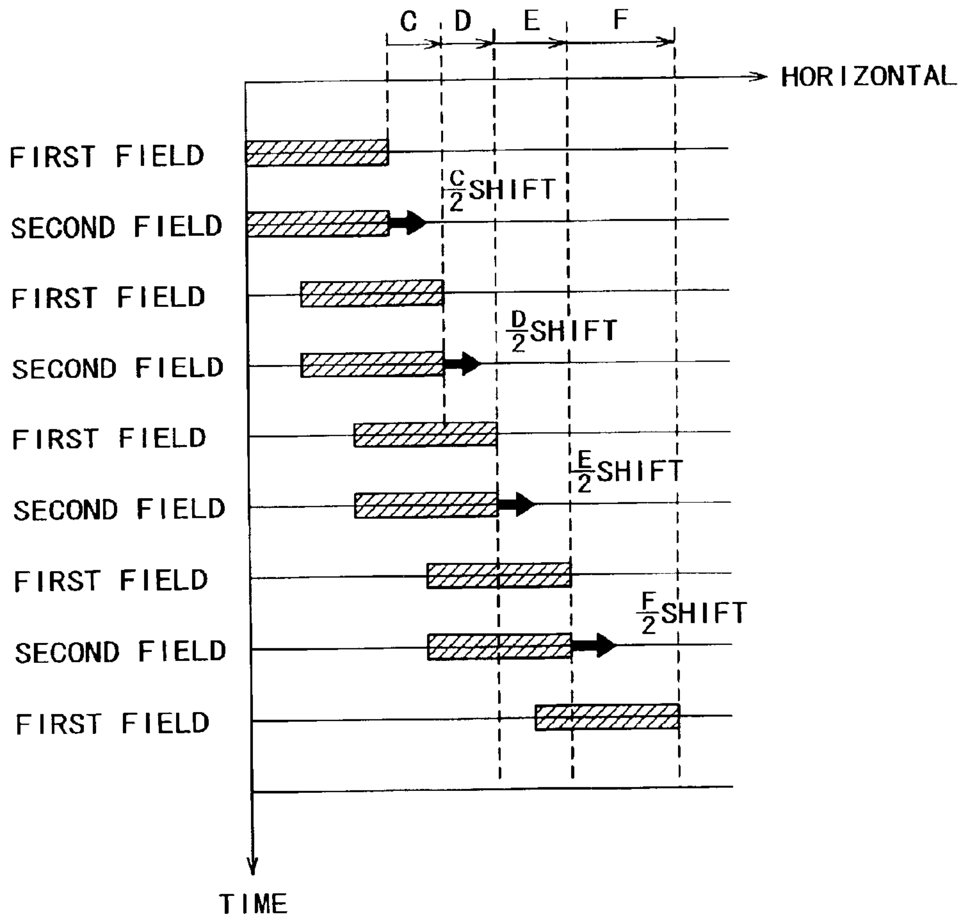
FIG. 13 is a diagram of assistance in explaining amounts of shift increased linearly with respect to time in the second embodiment.

As shown in FIG. 13, for example, the amount of shift of the image by the image shifting unit 15 can be set to 0 for a first field and set to ½ the vector quantity of a detected motion vector for a second field. In the case of FIG. 13, the amount of shift for the first field is set to 0. When the vector quantity is C, the image in the second field is shifted by C×½. When the vector quantity is D, the image is shifted by D×½ in the second field. Since one frame is formed by two fields, the amount of shift is increased by ½ the vector quantity, so that the amount of shift can be increased linearly with respect to time and motion of the image can be further smoothened.

Figure 14:
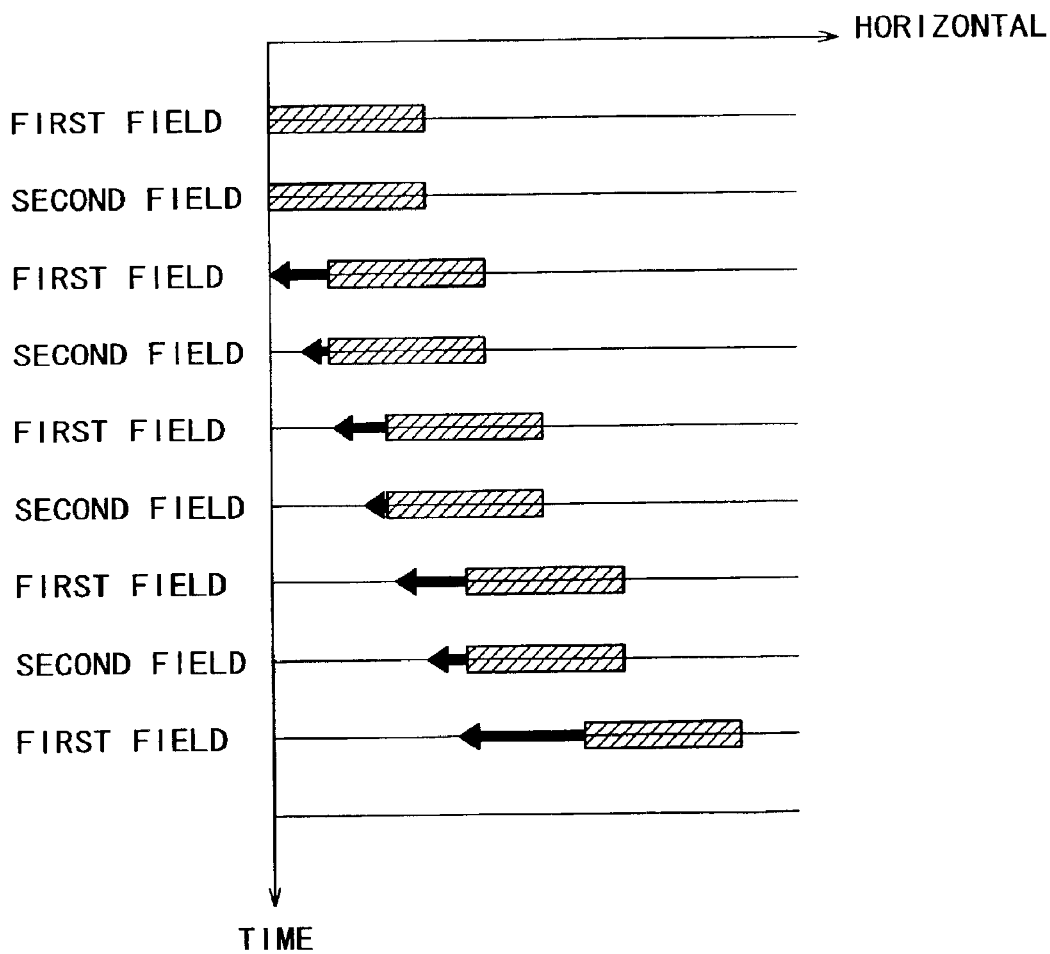
FIG. 14 is a diagram showing a case where an image is shifted in a direction opposite to a vector direction of a motion vector in the second embodiment.

It is to be noted that the image signal processing apparatus 7 according to the second embodiment is not limited to the above-described configuration and operation. For example, as shown in FIG. 14, the image can be shifted in a direction opposite to the vector direction of motion vectors. In FIG. 14, the amount of image shift at the time of a transition from a second field to a first field is distributed to the fields inputted subsequently, whereby similar effects to those of the embodiment shown in FIG. 12 can be obtained.

The amount of shift is set such that the amount of shift in a first field>the amount of shift in a second field. Also, the amount of shift can be set to ½ the vector quantity of a detected motion vector for the first field, and set to 0 for the second field. Thus, the amount of shift can be decreased linearly with respect to time and thereby motion of the image can be further smoothened.

Figure 15:
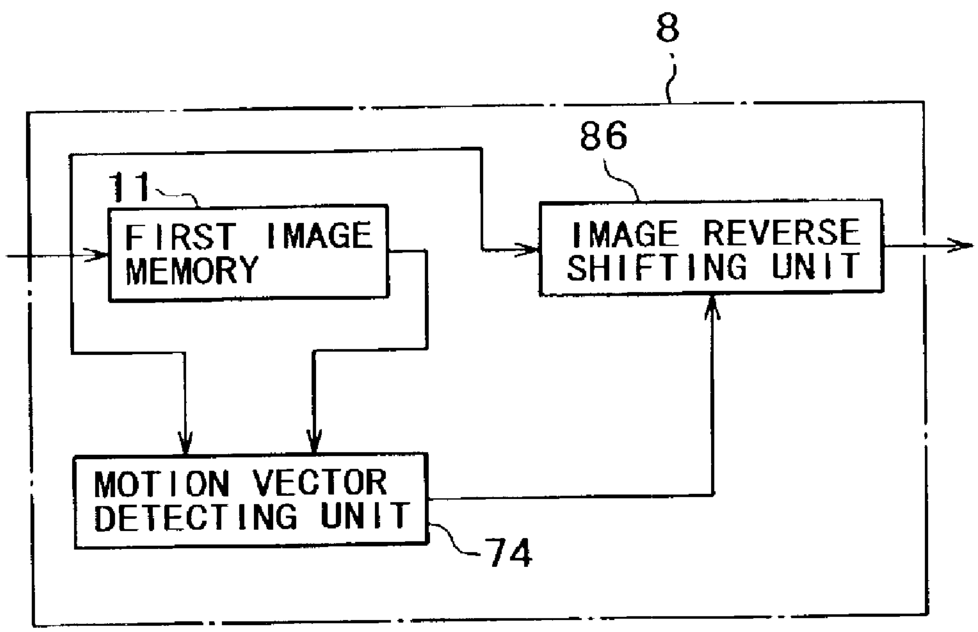
FIG. 15 is a block diagram of an image signal processing apparatus for shifting an image in a direction opposite to a vector direction of a motion vector in the second embodiment.

FIG. 15 shows an example of block configuration of an image signal processing apparatus 8 for shifting an image in a direction opposite to the vector direction of a motion vector. The same components as in FIG. 10 described above are identified by the same reference numerals, and their detailed description will be omitted.

The image signal processing apparatus 8 includes: a first image memory 11; a motion vector detecting unit 74; and an image reverse shifting unit 86.

The image reverse shifting unit 86 is supplied from the motion vector detecting unit 74 with a vector direction and a vector quantity of a motion vector with a delayed field as a reference. The image reverse shifting unit 86 is sequentially supplied from a field double speed conversion circuit 3 with an image signal in which one frame is formed by two fields.

A third embodiment of the present invention will next be described in detail with reference to drawings.

Figure 16:
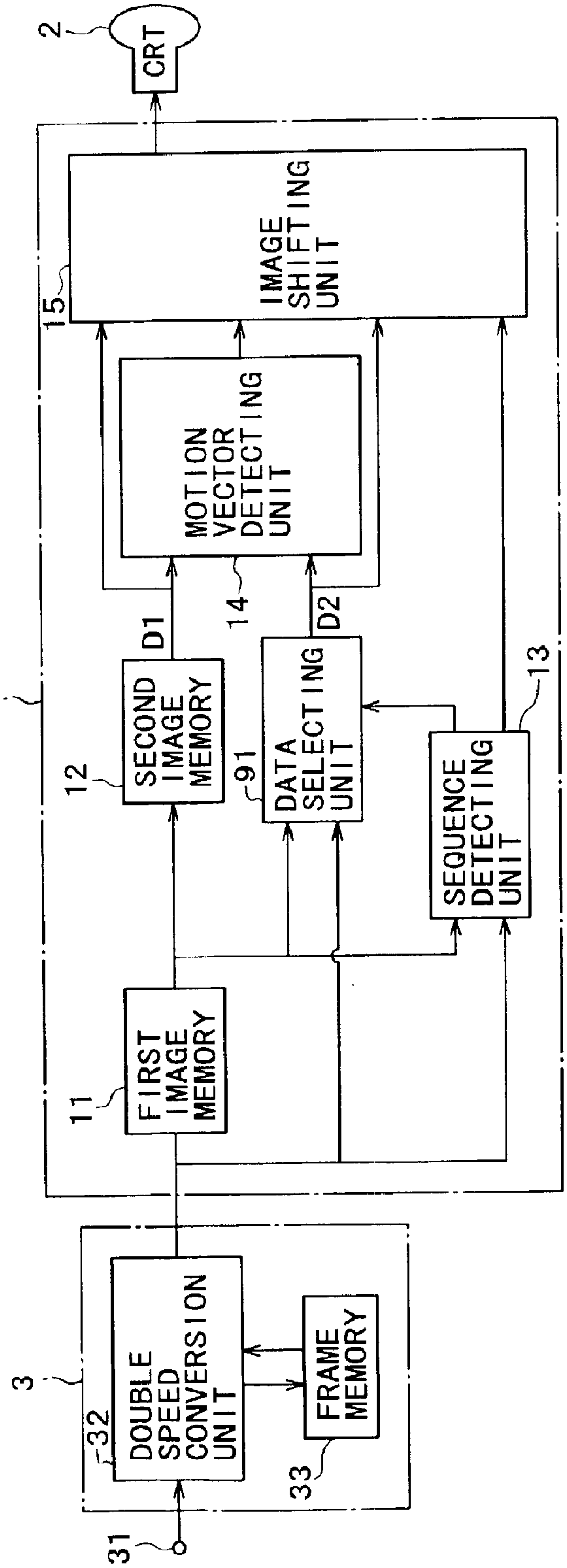
FIG. 16 is a block diagram of an image signal processing apparatus in a third embodiment.

FIG. 16 is a block diagram of an image signal processing apparatus 9 according to the third embodiment.

The image signal processing apparatus 9 is for example included in a television receiver using the PAL system, and is supplied with a telecine-converted image signal or a TV signal.

As shown in FIG. 16, the image signal processing apparatus 9 includes: a first image memory 11; a second image memory 12; a sequence detecting unit 13; a motion vector detecting unit 14; an image shifting unit 15; and a data selecting unit 91. For the same circuit components as in the image signal processing apparatus 1 of the first embodiment, reference is to be made to the description of the first embodiment, and description of the circuit components will be omitted.

The sequence detecting unit 13 is supplied with an image signal supplied to the first image memory 11 and a one-frame delayed image signal outputted from the first image memory. In addition to determining each field as described above, the sequence detecting unit 13 determines whether the image signal inputted to the image signal processing apparatus 9 is a telecine-converted signal or a TV signal, and then transmits a result of the determination to the data selecting unit 91.

The data selecting unit 91 is supplied with the image signal supplied to the first image memory 11 and the image signal outputted from the first image memory 11. The data selecting unit 91 selects one of the image signals supplied thereto on the basis of the result of the determination received from the sequence detecting unit 13. Specifically, when the sequence detecting unit 13 determines that the image signal inputted to the image signal processing apparatus 9 is a telecine-converted signal, the data selecting unit 91 selects the image signal supplied to the first image memory 11. When the sequence detecting unit 13 determines that the image signal inputted to the image signal processing apparatus 9 is a TV signal, the data selecting unit 91 selects the image signal outputted from the first image memory 11.

The data selecting unit 91 outputs the selected image signal D2 to the motion vector detecting unit 14. The motion vector detecting unit 14 detects an image signal D1 outputted from the second image memory 12 and the image signal D2 outputted from the data selecting unit 91, and then detects a motion vector by the block matching method, for example. The image signal D1 outputted from the second image memory 12 is a two-frame delayed field for a reference field. The image signal D2 outputted from the data selecting unit 91 is the reference field itself or a one-frame delayed field for the reference field.

Thus, by detecting a motion vector between the image signal D1 and the image signal D2, the motion vector detecting unit 14 can detect a motion vector between the reference field and the two-frame delayed signal and similarly detect a motion vector between the one-frame delayed signal for the reference field and the two-frame delayed signal for the reference field. In other words, a field interval in detecting a motion vector can be controlled on the basis of the result of the determination received from the sequence detecting unit 13.

Figure 17:
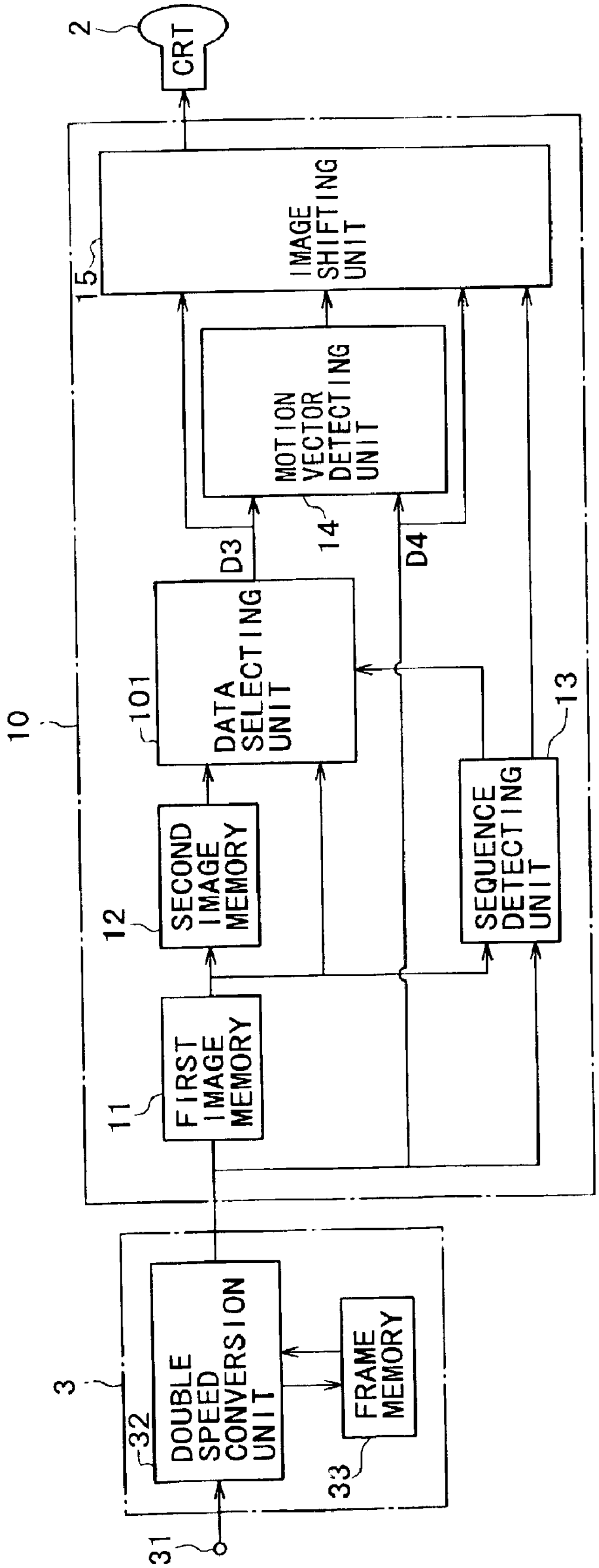
FIG. 17 is a diagram showing another block configuration in the third embodiment.
Figure 18:
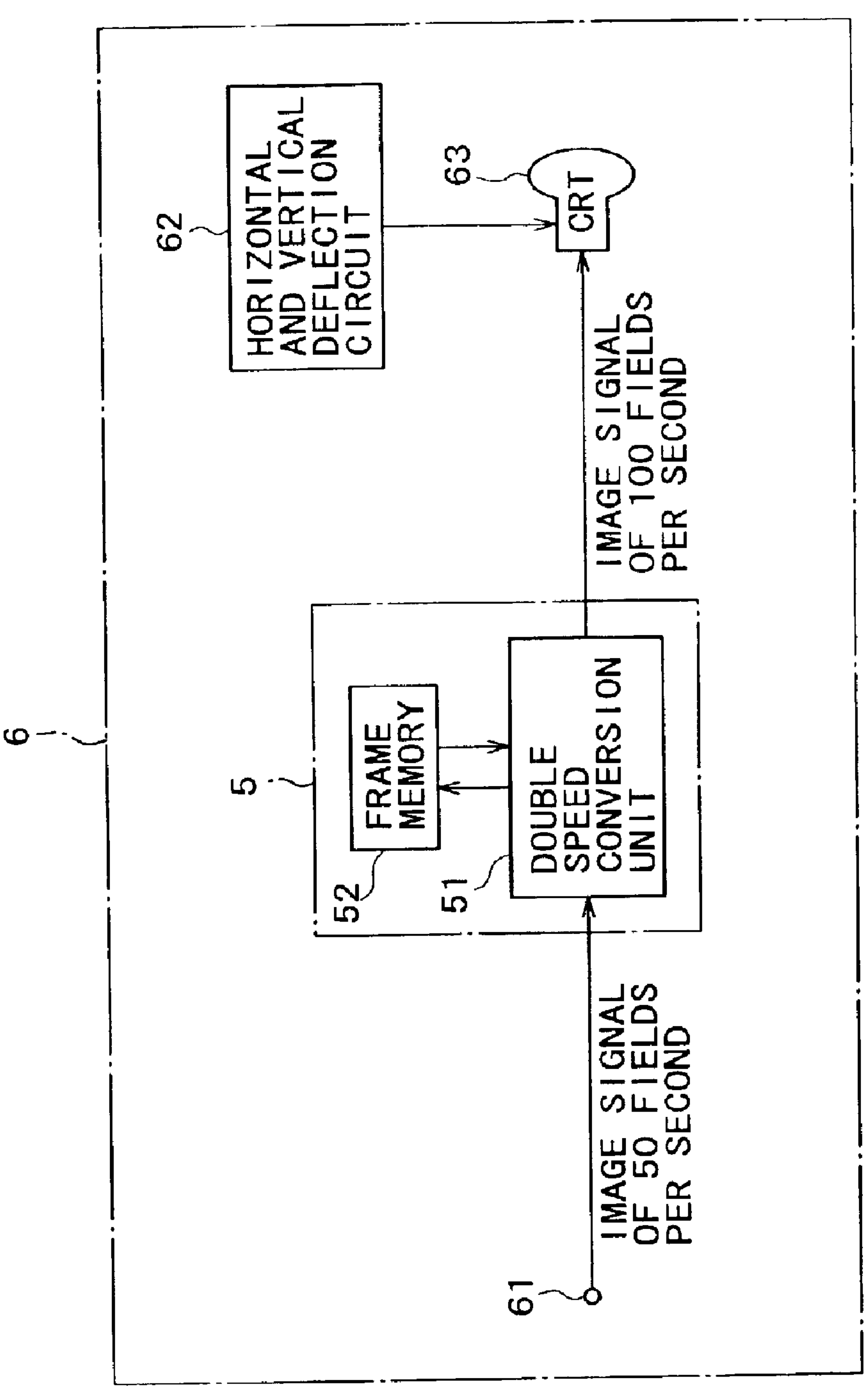
FIG. 18 is a block diagram of a field double speed conversion circuit to which a field frequency doubling method is applied.
Figure 19B:
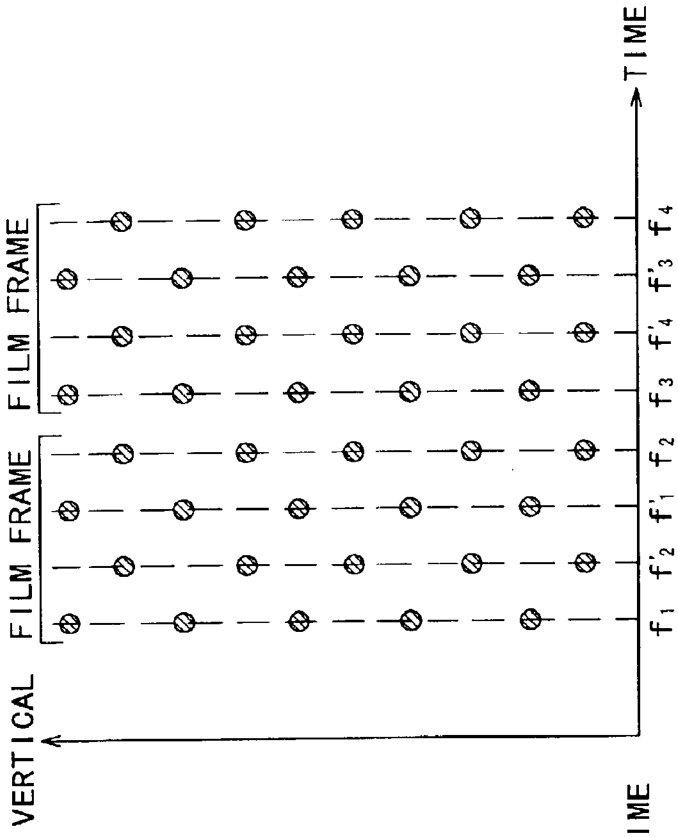
FIGS. 19A and 19B are diagrams showing a relation between a pixel position and each field before and after double speed conversion.
Figure 19A:
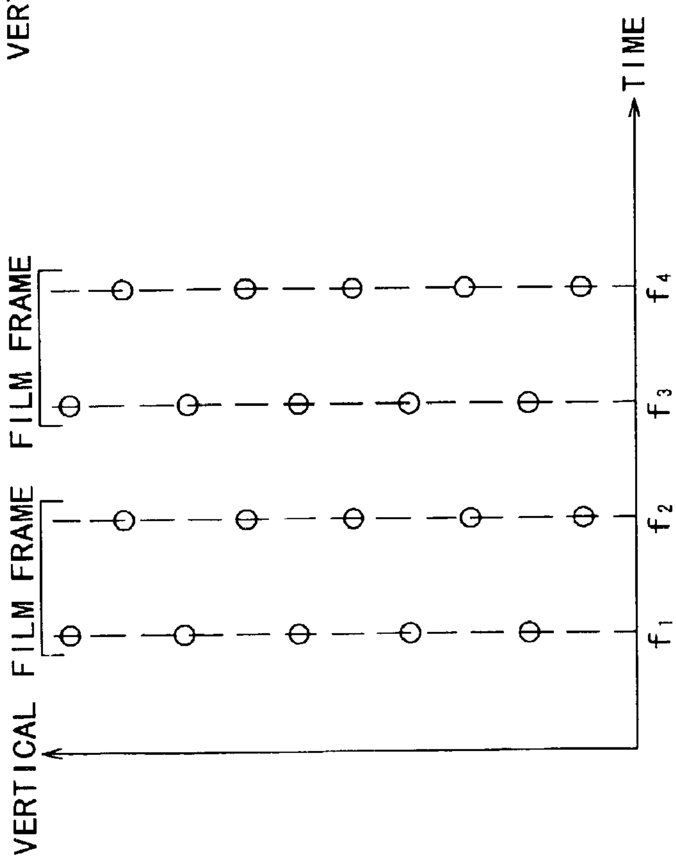
Figure 20B:
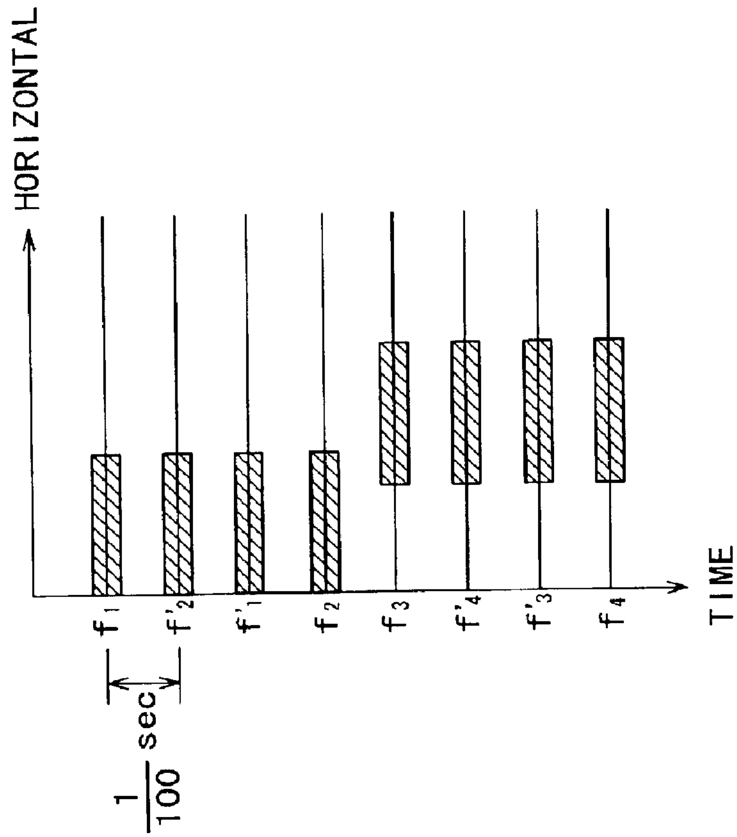
FIGS. 20A and 20B are diagrams showing a relation between an image position and each field when an image moves in a horizontal direction.
Figure 20A:
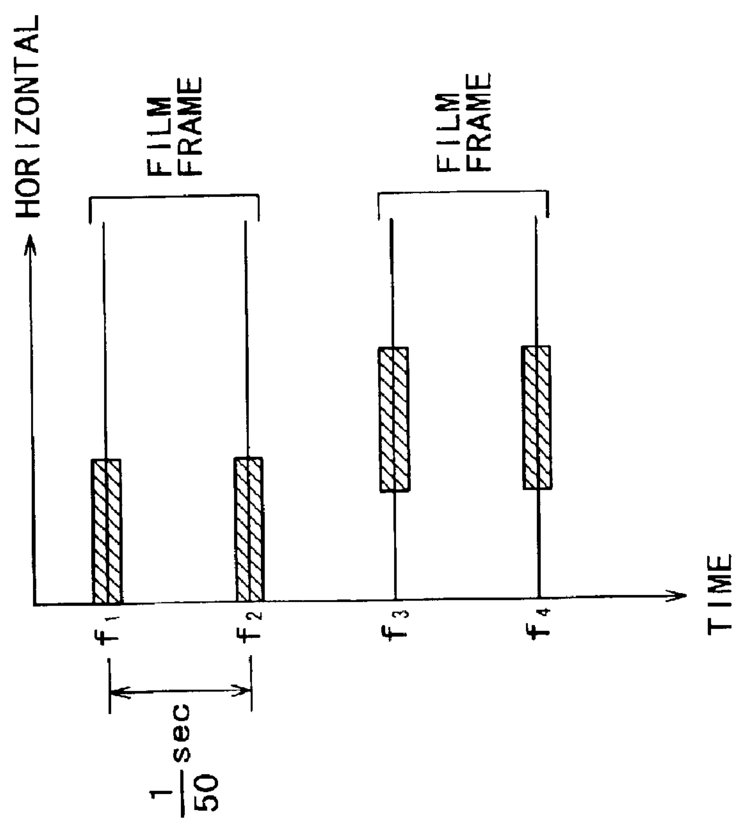
Figure 21B:
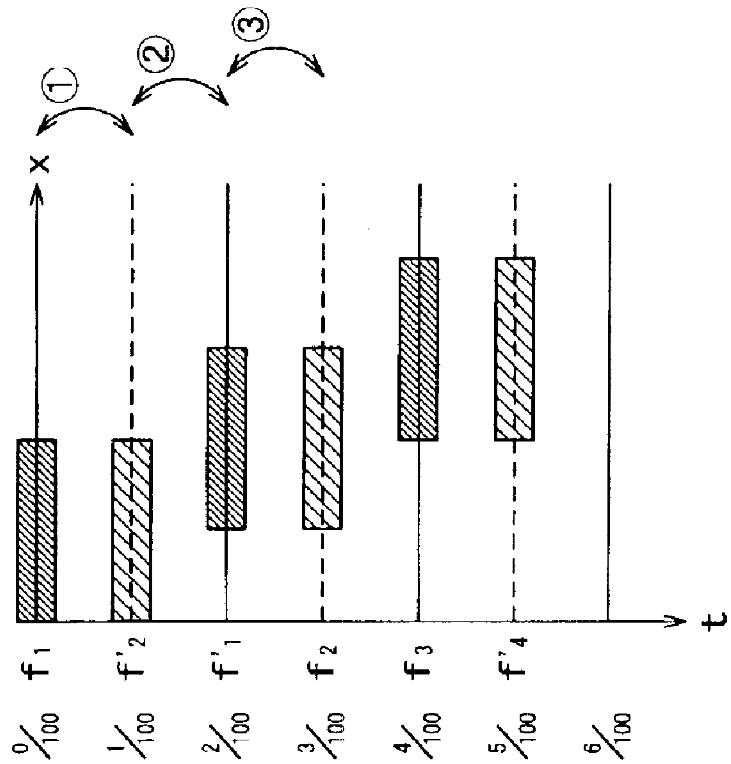
FIGS. 21A and 21B are diagrams showing a relation between an image position and each field when an image moves in a horizontal direction and a TV signal is inputted.
Figure 21A:
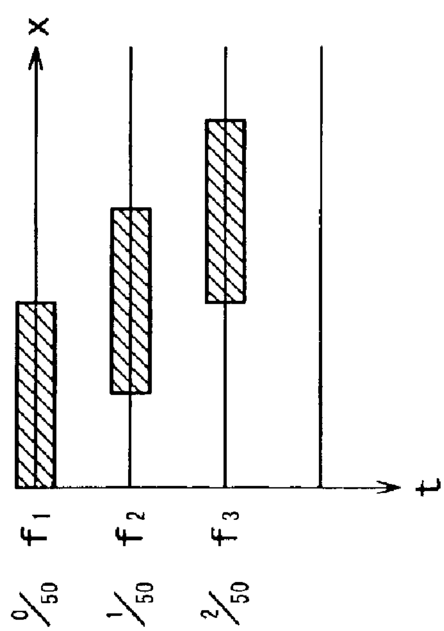

The third embodiment is also applicable to an image signal processing apparatus 10 shown in FIG. 17.

As shown in FIG. 17, the image signal processing apparatus 10 includes: a first image memory 11; a second image memory 12; a sequence detecting unit 13; a motion vector detecting unit 14; an image shifting unit 15; and a data selecting unit 101. For the same circuit components as in the image signal processing apparatus 1 of the first embodiment, reference is to be made to the description of the first embodiment, and description of the circuit components will be omitted.

The data selecting unit 101 is supplied with an image signal outputted from the first image memory 11 and an image signal outputted from the second image memory 12. The data selecting unit 101 selects one of the image signals supplied thereto on the basis of a result of determination received from the sequence detecting unit 13. Specifically, when the sequence detecting unit 13 determines that the image signal inputted to the image signal processing apparatus 10 is a telecine-converted signal, the data selecting unit 101 selects the image signal outputted from the second image memory 12. When the sequence detecting unit 13 determines that the image signal inputted to the image signal processing apparatus 10 is a TV signal, the data selecting unit 101 selects the image signal outputted from the first image memory 11. The data selecting unit 101 outputs the selected image signal to the motion vector detecting unit 14. The motion vector detecting unit 14 detects an image signal D3 supplied to the first image memory 11 and the image signal D4 outputted from the data selecting unit 101, and then detects a motion vector by the block matching method, for example. The image signal D4 outputted from the data selecting unit 101 is a one-frame delayed field or a two-frame delayed field for a reference field. The image signal D3 is the reference field itself.

Thus, by detecting a motion vector between the image signal D3 and the image signal D4, the motion vector detecting unit 14 can detect a motion vector between the reference field and the one-frame delayed signal and similarly detect a motion vector between the reference field and the two-frame delayed signal. In other words, a field interval in detecting a motion vector can be controlled on the basis of the result of the determination received from the sequence detecting unit 13.

The third embodiment performs an operation as described in the first embodiment when it is determined that the image signal inputted thereto is a telecine-converted image signal, and performs an operation as described in the second embodiment when it is determined that the image signal inputted thereto is a TV signal.

In addition, as with the first and second embodiments, the third embodiment can shift an image in a direction opposite to the vector direction of a motion vector.

Thus, in the third embodiment of the present invention employing the above-described configuration, by integrating a field double speed conversion circuit 3 into the image signal processing apparatus and including the image signal processing apparatus in the television receiver, it is possible to eliminate perceived discontinuity of motion that is specific to an image signal after telecine conversion and double speed conversion and also make motion correction for a TV signal in a similar manner. Specifically, motion of each image having resolution improved and plane flicker disturbance suppressed by the field double speed conversion circuit 3 can be further smoothened by the image signal processing apparatus 9 and 10, whereby image quality can be improved synergistically.

Furthermore, even when both a telecine-converted image signal and a TV signal are inputted, the image signal processing apparatus 9 and 10 can efficiently eliminate the discontinuity of image motion. Thus, the image signal processing apparatus 9 and 10 can be included in a television receiver supplied with both a film signal and a TV signal. Also, a television receiver that has already been commercialized can be readily upgraded by newly including the image signal processing apparatus 9 and 10 in the television receiver. Thus, versatility of the image signal processing apparatus 9 and 10 can be further increased.

It is to be noted that the present invention is not limited to application to television receivers using the PAL system; the present invention is applicable to television receivers using the NTSC (National TV System Committee) system that are supplied with an interlaced image signal of 60 fields per second (30 frames per second), for example. The present invention is also applicable to television receivers using the SECAM system.

In addition, the image signal processing apparatus according to the present invention can be included not only in television receivers but also in signal converters connected to a television receiver.

Furthermore, the present invention can be applied to a case where an image signal such as is transmitted on the Internet is displayed on a PC or the like, and a case where media or image format is changed.

Furthermore, while in the above description, the present invention is realized by hardware such as circuits and the like, the present invention can of course be realized as software on a processor.

The present invention is not limited to the details of the above-described preferred embodiments. The scope of the invention is defined by the appended claims and all changes and modifications as fall within the equivalence of the scope of the claims are therefore to be embraced by the invention.

What is claimed is:

1. An image signal processing apparatus, comprising:

sequence detecting means for receiving an image signal inputted thereto that is generated by subjecting an image obtained by converting a film image into a video image to double speed conversion, in which signal a film frame begins with a first field and one film frame is formed by four fields, calculating a difference value between pixel signal level of a detected pixel in a present field of the inputted image signal and pixel signal level of a detected pixel at a position identical with a position of the detected pixel in the present field in a field one frame after said present field of the inputted image signal, and identifying said first field on the basis of the difference value;

motion vector detecting means for detecting a motion vector of the detected pixel in said present field with respect to a field two frames after said present field; and image control means for shifting the position of the detected pixel in said present field in a vector direction of the detected motion vector within a range of a vector quantity of motion vector;

wherein image control means sets an amount of shift to a minimum in said first field identified by said sequence detecting means and progressively increases said amount of shift for each field subsequent to said first field.

2. An image signal processing apparatus as claimed in claim 1, wherein when said difference value consecutively becomes 0, said sequence detecting means identifies a previously inputted present field as said first field.

3. An image signal processing apparatus as claimed in claim 1, wherein image control means sets the amount of shift in said first field to 0.

4. An image signal processing apparatus as claimed in claim 3, wherein image control means increases said amount of shift by ¼ the vector quantity of the detected motion vector for each field subsequent to said first field.

5. An image signal processing apparatus as claimed in claim 1, wherein motion vector detecting means detects motion vector for each block formed by a predetermined number of pixels by a block matching method.

6. An image signal processing apparatus as claimed in claim 1, further including double speed conversion means for doubling field frequency of an image signal in which one film frame is formed by two fields and thereby generating said inputted image signal in which one film frame is formed by four fields.

7. An image signal processing apparatus as claimed in claim 1, wherein said inputted image signal is an interlaced image signal of a PAL system.

8. An image signal processing apparatus, comprising:

sequence detecting means for receiving an image signal inputted thereto that is generated by subjecting an image obtained by converting a film image into a video image to double speed conversion, in which signal a film frame begins with a first field and one film frame is formed by four fields, calculating a difference value between pixel signal level of a detected pixel in a present field of the inputted image signal and pixel signal level of a detected pixel at a position identical with a position of the detected pixel in the present field in a field one frame before said present field of the inputted image signal, and identifying said first field on the basis of the difference value;

motion vector detecting means for detecting a motion vector of the detected pixel in said present field with a field two frames before said present field as a reference; and image control means for shifting the position of the detected pixel in said present field in a direction opposite to a vector direction of the detected motion vector within a range of a vector quantity of said motion vector;

wherein image control means sets an amount of shift to a maximum in said first field identified by said sequence detecting means and progressively decreases said amount of shift for each field subsequent to said first field.

9. An image signal processing apparatus as claimed in claim 8, wherein when said difference value consecutively becomes 0, said sequence detecting means identifies a previously inputted present field as said first field.

10. An image signal processing apparatus as claimed in claim 8, wherein image control means sets said amount of shift in said first field to ¾ said vector quantity and progressively decreases said amount of shift by ¼ said vector quantity for each field subsequent to said first field.

11. An image signal processing apparatus receiving an image signal inputted thereto that is generated by subjecting a television signal to double speed conversion, in which image signal a frame begins with a first field and one frame is formed by two fields, image signal processing apparatus comprising:

motion vector detecting means for detecting a motion vector of a detected pixel in a present field with respect to a field one frame after said present field; and image control means for shifting a position of the detected pixel in said present field in a vector direction of the detected motion vector within a range of a vector quantity of motion vector;

wherein image control means sets an amount of shift to a minimum in said first field and progressively increases said amount of shift for each field subsequent to said first field.

12. An image signal processing apparatus as claimed in claim 11, wherein image control means sets the amount of shift in said first field to 0.

13. An image signal processing apparatus as claimed in claim 12, wherein image control means sets said amount of shift in a second field subsequent to said first field to ½ said vector quantity of the detected motion vector.

14. An image signal processing apparatus receiving an image signal inputted thereto that is generated by subjecting a television signal to double speed conversion, in which image signal a frame begins with a first field and one frame is formed by two fields, image signal processing apparatus comprising:

motion vector detecting means for detecting a motion vector of a detected pixel in a present field with a field one frame before said present field as a reference; and image control means for shifting a position of the detected pixel in said present field in a direction opposite to a vector direction of the detected motion vector within a range of a vector quantity of said motion vector;

wherein image control means sets an amount of shift to a maximum in said first field and progressively decreases said amount of shift for each field subsequent to said first field.

15. An image signal processing apparatus as claimed in claim 14, wherein image control means sets said amount of shift in said first field to ½ said vector quantity and sets said amount of shift in a second field subsequent to said first field to 0.

16. An image signal processing apparatus, comprising:

sequence detecting means for receiving a double-speed-converted image signal inputted thereto, in which signal a frame begins with a first field, calculating a difference value between pixel signal level of a detected pixel in a present field of the inputted image signal and pixel signal level of a detected pixel at a position identical with a position of the detected pixel in said present field in a field one frame after said present field of the inputted image signal, and identifying said first field on the basis of the difference value;

motion vector detecting means for detecting a motion vector of the detected pixel in said present field with respect to a field one frame or two frames after said present field; and image control means for shifting the position of the detected pixel in said present field in a vector direction of the detected motion vector within a range of a vector quantity of motion vector;

wherein image control means sets an amount of shift to a minimum in said first field identified by said sequence detecting means and progressively increases said amount of shift for each field subsequent to said first field.

17. An image signal processing apparatus as claimed in claim 16, wherein image control means changes said amount of shift according to a number of fields forming the frame.

18. An image signal processing apparatus as claimed in claim 16, wherein image signal processing apparatus receives an image signal generated by subjecting a telecine-converted image to double speed conversion in which signal one film frame is formed by four fields or an image signal generated by subjecting a television signal to double speed conversion in which image signal one frame is formed by two fields; and when said difference value includes at least 0, motion vector detecting means detects a motion vector with respect to a field two frames after said present field, and when said difference value does not include 0, motion vector detecting means detects a motion vector with respect to a field one frame after said present field.

19. An image signal processing apparatus as claimed in claim 16, wherein when said difference value includes at least 0 and said difference value consecutively becomes 0, said sequence detecting means identifies a previously inputted present field as said first field.

20. An image signal processing apparatus as claimed in claim 16, wherein image control means sets the amount of shift in said first field to 0.

21. An image signal processing apparatus as claimed in claim 20, wherein image control means increases said amount of shift for each field subsequent to said first field by an amount obtained by dividing the vector quantity of the detected motion vector by a number of fields forming the frame.

22. An image signal processing apparatus comprising:

sequence detecting means for receiving a double-speed-converted image signal inputted thereto, in which signal a frame begins with a first field, calculating a difference value between pixel signal level of a detected pixel in a present field of the inputted image signal and pixel signal level of a detected pixel at a position identical with a position of the detected pixel in said present field in a field one frame before said present field of the inputted image signal, and identifying said first field on the basis of the difference value;

motion vector detecting means for detecting a motion vector of the detected pixel in said present field with a field one frame or two frames before said present field as a reference; and image control means for shifting the position of the detected pixel in said present field in a direction opposite to a vector direction of the detected motion vector within a range of a vector quantity of said motion vector;

wherein image control means sets an amount of shift to a maximum in said first field identified by said sequence detecting means and progressively decreases said amount of shift for each field subsequent to said first field.

23. An image signal processing method comprising the steps of:

receiving an inputted image signal that is generated by subjecting an image obtained by converting a film image into a video image to double speed conversion, in which signal a film frame begins with a first field and one film frame is formed by four fields;

identifying said first field on the basis of a difference value calculated between pixel signal level of a detected pixel in a present field of the inputted image signal and pixel signal level of a detected pixel at a position identical with a position of the detected pixel in the present field in a field one frame after said present field of the inputted image signal;

detecting a motion vector of the detected pixel in said present field with respect to a field two frames after said present field; and shifting the position of the detected pixel in a vector direction of the detected motion vector such that an amount of shift is set to a minimum in said first field identified and said amount of shift is progressively increased for each field subsequent to said first field within a range of a vector quantity of the detected motion vector.

24. An image signal processing method comprising the steps of:

receiving an inputted double-speed-converted image signal, in which signal a frame begins with a first field;

identifying said first field on the basis of a difference value calculated between pixel signal level of a detected pixel in a present field of the inputted image signal and pixel signal level of a detected pixel at a position identical with a position of the detected pixel in the present field in a field one frame after said present field of the inputted image signal;

detecting a motion vector of the detected pixel in said present field with respect to a field one frame or two frames after said present field; and shifting the position of the detected pixel in a vector direction of motion vector such that an amount of shift is set to a minimum in said first field identified and said amount of shift is progressively increased for each field subsequent to said first field within a range of a vector quantity of motion vector.

* * * * *